(12) United States Patent
Robinson et al.

(10) Patent No.: US 11,978,965 B2
(45) Date of Patent: *May 7, 2024

(54) SYSTEMS UTILIZING INTEGRATED ROOFING ACCESSORIES FOR CONTROLLING DIRECTIONS OF COMMUNICATIONS AND METHODS OF USE THEREOF

(71) Applicant: BMIC LLC, Dallas, TX (US)

(72) Inventors: Rich Robinson, Round Rock, TX (US); Xavier Riley, San Jose, TX (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,718

(22) Filed: Feb. 7, 2023

(65) Prior Publication Data

US 2023/0208024 A1    Jun. 29, 2023

Related U.S. Application Data

(63) Continuation of application No. 17/164,767, filed on Feb. 1, 2021, now Pat. No. 11,588,235, which is a
(Continued)

(51) Int. Cl.
*H01Q 1/42*     (2006.01)
*H01Q 1/44*     (2006.01)
*H01Q 3/02*     (2006.01)

(52) U.S. Cl.
CPC .............. *H01Q 3/02* (2013.01); *H01Q 1/42* (2013.01); *H01Q 1/44* (2013.01)

(58) Field of Classification Search
CPC .......... H01Q 21/28; H01Q 21/065; H01Q 1/22
See application file for complete search history.

(56) References Cited

U.S. PATENT DOCUMENTS

2017/0082754 A1*  3/2017  Ram .................... H01Q 1/1257
2018/0331413 A1   11/2018  Adriazola et al.
(Continued)

FOREIGN PATENT DOCUMENTS

CN          108880638 A        11/2018

*Primary Examiner* — Graham P Smith
(74) *Attorney, Agent, or Firm* — GREENBERG TRAURIG, LLP

(57) ABSTRACT

Systems and methods of the present disclosure include controlling directions of communications including a processor to obtain performance data of an integrated roofing accessory installed on a roof, the integrated roofing accessory including an antenna and a transceiver to enable fifth generation cellular networking (5G) protocol communication with a 5G-enabled device, and an adjustable attachment to orient or position the antenna. The performance data is indicative of 5G signal performance between the integrated roofing accessory and the 5G-enabled device. A signal performance affecting condition is determined using the performance data, where the signal performance affecting condition is a reduced signal performance of a 5G signal beam of the antenna. An improved orientation or an improved position of the antenna is determined to remedy the signal performance affecting condition. The adjustable attachment is controlled to physically adjust the orientation of the position to achieve the improved orientation or position.

20 Claims, 19 Drawing Sheets

Related U.S. Application Data continuation-in-part of application No. 17/013,468, filed on Sep. 4, 2020, now Pat. No. 10,910,693.

(60) Provisional application No. 62/895,855, filed on Sep. 4, 2019.

(56) References Cited

U.S. PATENT DOCUMENTS

| | | |
|---|---|---|
| 2018/0331720 A1 | 11/2018 | Adriazola et al. |
| 2019/0067792 A1 | 2/2019 | Au |
| 2020/0185818 A1 | 6/2020 | Kim et al. |

* cited by examiner

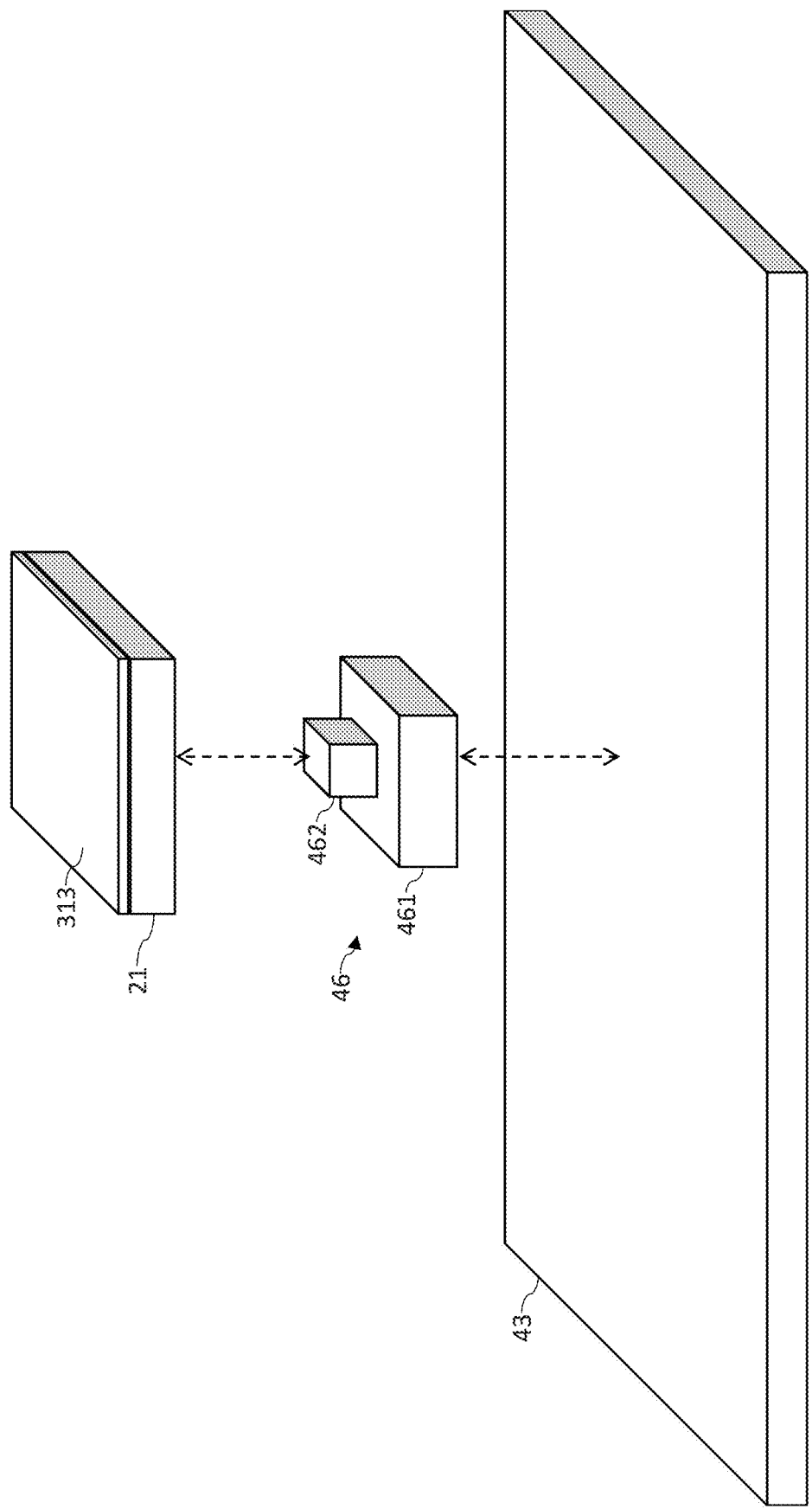

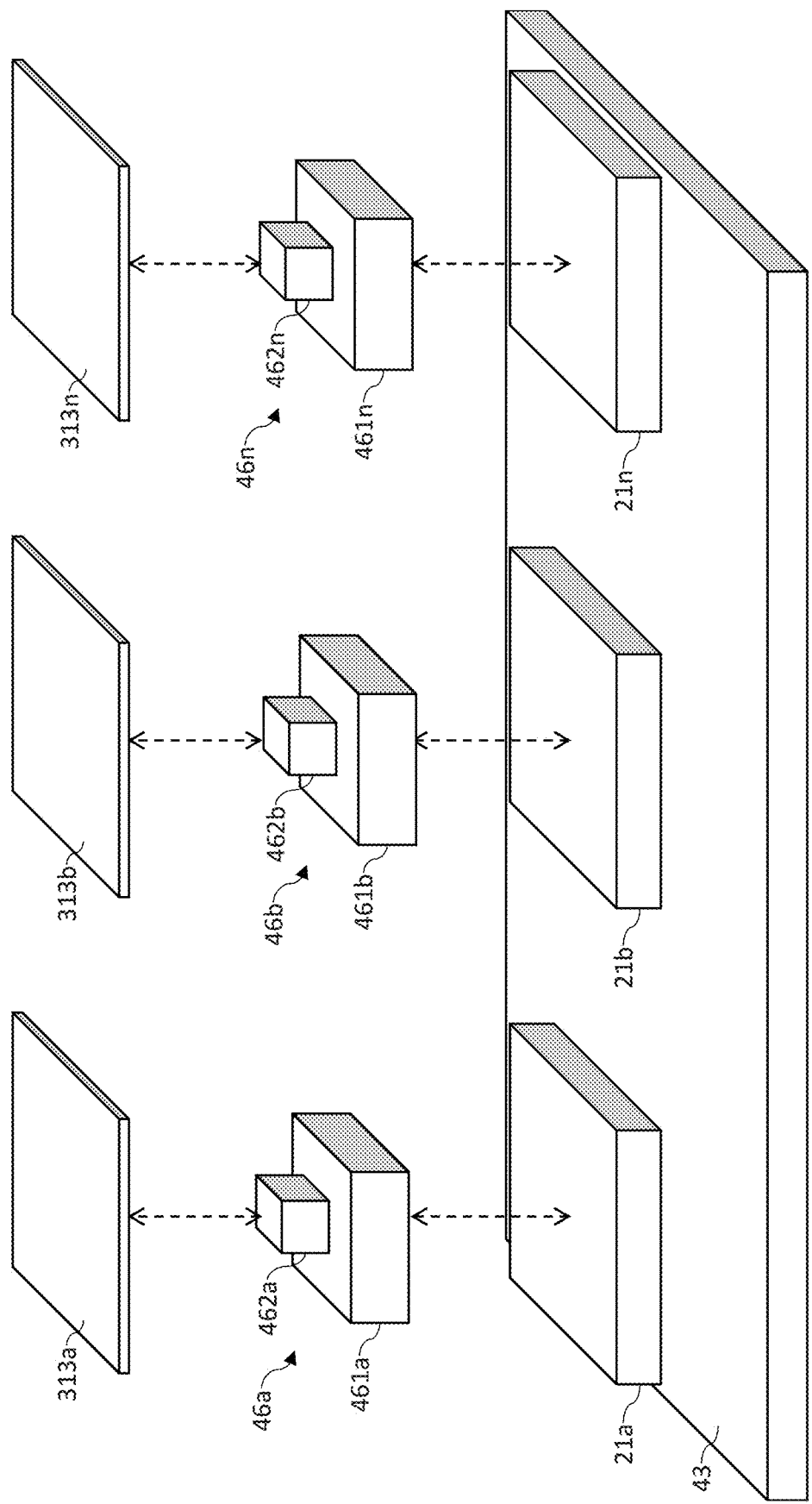

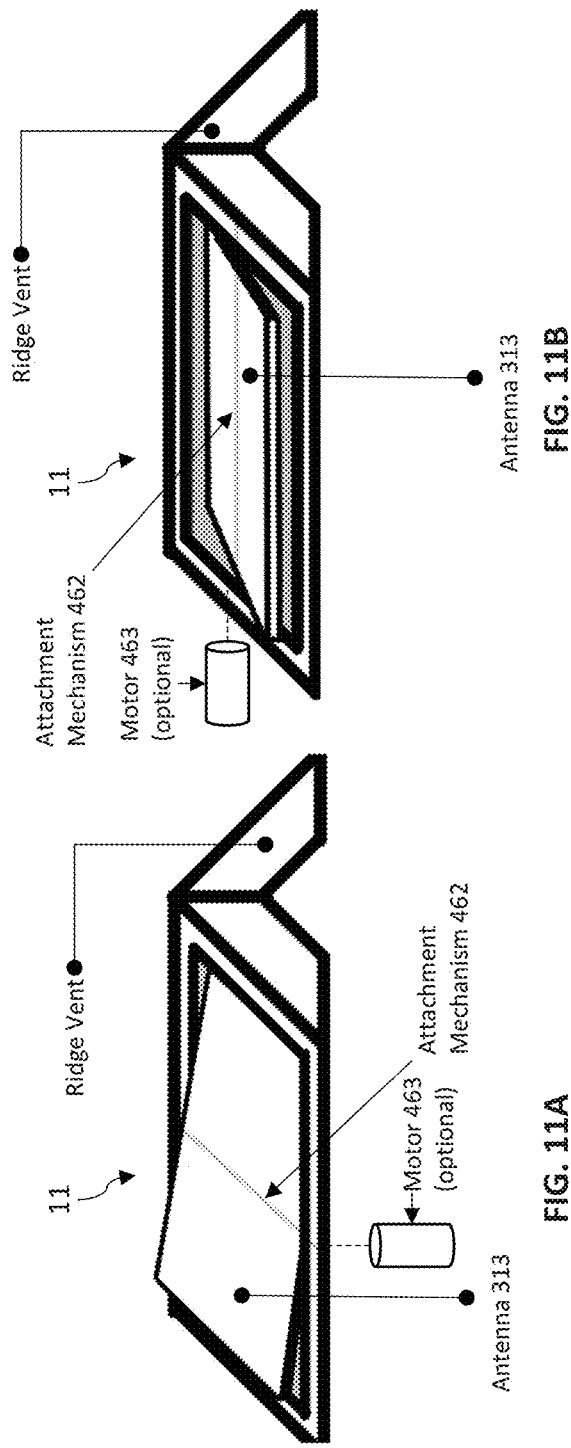

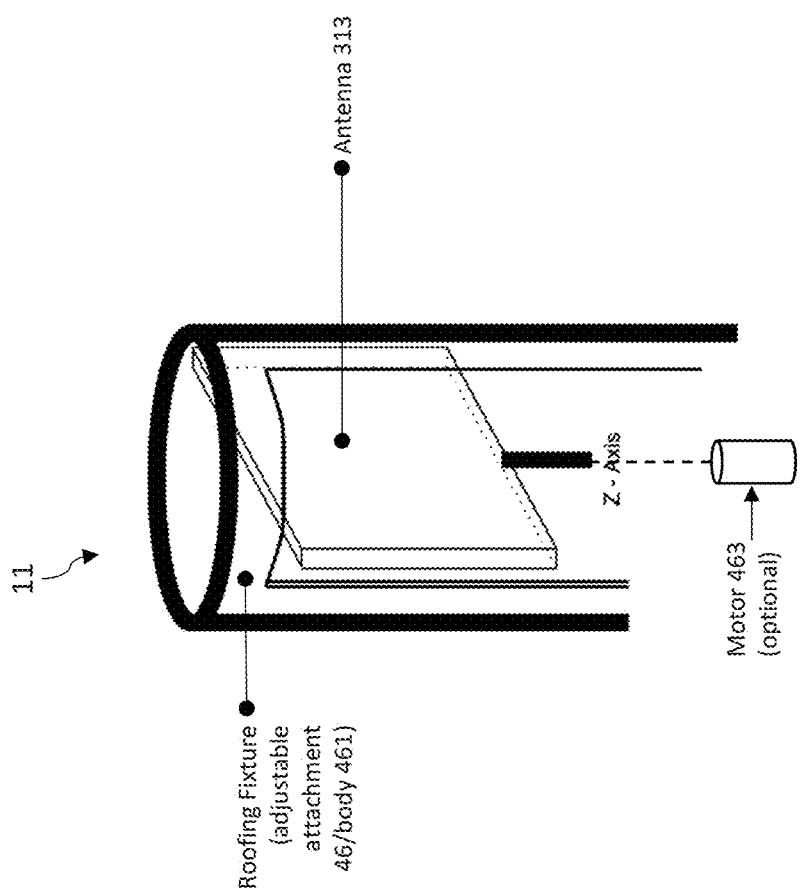

SYSTEMS UTILIZING INTEGRATED ROOFING ACCESSORIES FOR CONTROLLING DIRECTIONS OF COMMUNICATIONS AND METHODS OF USE THEREOF

CROSS-REFERENCE TO RELATED APPLICATIONS

This application is a continuation of U.S. patent application Ser. No. 17/164,767, filed on Feb. 1, 2021, which is a continuation-in-part of U.S. Pat. No. 10,910,693, issued on Feb. 2, 2021, which claims priority to U.S. Provisional Application 62/895,855, filed on Sep. 4, 2019, which are herein incorporated by reference in their entirety.

FIELD OF TECHNOLOGY

The field of the present disclosure relates to structures having 5G-enabled integrated roofing accessories with wiring passthroughs, including integrated shingles and other suitable roofing accessories.

BACKGROUND OF THE TECHNOLOGY

With the coming 5G network buildout by major carriers, typically, traditional wireless/cellular/over-air deployments will not work at scale. Due to the frequencies required to deliver on network speeds and reduce latency, signal propagation suffers.

Consequently, many carriers around the world are deploying coverage using fifth generation cellular networking (5G) protocols over current 4G/LTE networks (herein referred to as "5G(lite)"), such as, e.g., using frequencies below 6 GHz ("sub-6" or "sub-6 GHz"). However, such solutions are not capable of the speeds and latencies of millimeter wave (mmWave) networks using 5G protocols (referred to herein as "5G").

On average, 5G signals propagate about 300 meters in good conditions, but are easily blocked by trees, walls and/or inclement weather. The result is that the mmWave signals of 5G have a greatly reduced effective distance. As the frequencies are raised, the distance that an effective 5G signal can be sent is reduced and the probability of signal blocking/absorption also increases.

As a result, there is a need for denser 5G cell site installations than 4G, LTE and 5G(lite) deployments. Additionally, the supporting infrastructure (backhaul) to connect the 5G cell sites or antennas to the carriers, ultimately to the internet, typically employs fiber optic cabling. Supporting a fiber connection every few hundred meters, as needed for effective 5G coverage, is difficult, if not impossible. The time and costs to do so are the current impediment to 5G rollout.

SUMMARY OF THE DISCLOSURE

Systems, methods and apparatuses of embodiments of the present description enable widespread and cost effective 5G signal coverage using dense cell sites by embedding 5G-capable infrastructure in roofing accessories that are installable in commercial and/or residential roofing structures.

In some embodiments, the present description provides an exemplary system that include at least the following components: at least one first integrated roofing accessory installed on a first roof, where the at least one first integrated roofing accessory includes: i) at least one first transceiver configured to produce millimeter wave (mmWave) frequency signals using at least one fifth generation cellular networking (5G) protocol, ii) at least one first dielectric antenna in electrical communication with the at least one first transceiver for emitting the mmWave frequency signals according to the 5G protocols, iii) a first edge computing device having first processors and first non-transitory storages with first software to operate the first edge computing device in communication with the at least one first transceiver, and iv) at least one at least one first power supply. At least one second integrated roofing accessory is installed on a second roof, where the at least one second integrated roofing accessory includes: i) at least one second transceiver configured to produce the mmWave frequency signals using the 5G protocols, ii) at least one second dielectric antenna in electrical communication with the second transceivers for emitting the mmWave frequency signals according to the 5G protocols, iii) a second edge computing device having second processors and second non-transitory storages with second software to operate the second edge computing device in communication with the second transceivers, and iv) a second power supply. At least one third integrated roofing accessory is installed on a third roof, where the at least one third integrated roofing accessory includes: i) at least one third transceiver configured to produce the mmWave frequency signals using the 5G protocols, ii) at least one third dielectric antenna in electrical communication with the at least one third transceiver for emitting the mmWave frequency signals according to the 5G protocols, iii) a third edge computing device having third processors and third non-transitory storages with third software to operate the third edge computing device in communication with the at least one third transceiver, and iv) a third power supply. The first software, the second software and the third software are configured to cause, when executed, the at least one first integrated roofing accessory, the at least one second integrated roofing accessory and third the plurality of integrated roofing accessories to form a 5G network using the mmWave frequency signals, and at least one of the first software, the second software, and the third software are further configured to cause, when executed, the 5G network to communicate with at least one computing device.

Another illustrative embodiment of the present description provides a method that includes at least: obtaining at least one first integrated roofing accessory, including: i) at least one first transceiver configured to produce mmWave frequency signals using 5G protocols, ii) at least one first dielectric antenna in electrical communication with the at least one first transceiver for emitting the mmWave frequency signals according to the at least one 5G protocol, iii) a first edge computing device having at least one first processor and at least one first non-transitory storage with software. The systems and methods include mounting the at least one first integrated roofing accessory on a first roof. Further included is obtaining at least one second integrated roofing accessory, including: i) at least one second transceiver configured to produce the mmWave frequency signals using the at least one 5G protocol, ii) at least one second dielectric antenna in electrical communication with the at least one second transceiver for emitting the mmWave frequency signals according to the at least one 5G protocol, iii) a second edge computing device having at least one second processor and at least one second non-transitory storage with software. The systems and methods include mounting the at least one second integrated roofing accessory on a second roof. Further included is obtaining at least one third integrated roofing accessory, including: i) at least one third transceiver configured to produce the mmWave frequency signals using the at least one 5G protocol, ii) at least one third dielectric antenna in electrical communication with the at least one third transceiver for emitting the mmWave frequency signals according to the at least one 5G protocol, iii) a third edge computing device having at least one third processor and at least one third non-transitory storage with software. The systems and methods include mounting the at least one third integrated roofing accessory on a third roof. The first software, the second software and the third software are configured to cause, when executed, the at least one first integrated roofing accessory, the at least one second integrated roofing accessory and third the plurality of integrated roofing accessories to form a 5G network using the mmWave frequency signals, and at least one of the first software, the second software, and the third software are further configured to cause, when executed, the 5G network to communicate with at least one computing device.

Another illustrative embodiment of the present description provides a method that includes at least: controlling, by at least one first processor of at least one edge computing device of at least one first integrated roofing accessory, at least one first transceiver to produce mmWave frequency signals using at least one 5G protocol, where the at least one first integrated roofing accessory is installed on a first roof. At least one first dielectric antenna is controlled by the at least one first transceiver to emit the mmWave frequency signals according to the at least one 5G protocol. Further included is controlling, by at least one second processor of at least one edge computing device of at least one second integrated roofing accessory, at least one second transceiver to produce the mmWave frequency signals using the at least one 5G protocol, where the at least one second integrated roofing accessory is installed on a second roof. At least one second dielectric antenna is controlled by the at least one second transceiver to emit the mmWave frequency signals according to the at least one 5G protocol. Further included is controlling, by at least one third processor of at least one edge computing device of at least one third integrated roofing accessory, at least one third transceiver to produce the mmWave frequency signals using the at least one 5G protocol, where the at least one third integrated roofing accessory is installed on a third roof. At least one third dielectric antenna is controlled by the at least one third transceiver to emit the mmWave frequency signals according to the at least one 5G protocol. The at least one first processor, the at least one second processor and the at least one third processor, produces a 5G network using the mmWave frequency signals, and at least one of the at least one first processor, the at least one second processor and the at least one third processor cause the network to communicate with at least one computing device.

In some embodiments, the present description provides an exemplary system that include at least the following components: a first plurality of integrated roofing accessories installed on a first roof, where the first plurality of integrated roofing accessories include: i) at least one first transceiver configured to produce millimeter wave (mmWave) frequency signals using at least one fifth generation cellular networking (5G) protocol, ii) at least one first dielectric antenna in electrical communication with the at least one first transceiver for emitting the mmWave frequency signals according to the 5G protocols, iii) a first edge computing device having first processors and first non-transitory storages with first software to operate the first edge computing device in communication with the at least one first transceiver, and iv) at least one first power supply. A second plurality of integrated roofing accessories are installed on a second roof, where the second plurality of integrated roofing accessories include: i) at least one second transceiver configured to produce the mmWave frequency signals using the 5G protocols, ii) at least one second dielectric antenna in electrical communication with the at least one second transceiver for emitting the mmWave frequency signals according to the 5G protocols, iii) a second edge computing device having second processors and second non-transitory storages with second software to operate the second edge computing device in communication with the at least one second transceiver, and iv) at least one second power supply. A third plurality of integrated roofing accessories are installed on a third roof, where the third plurality of integrated roofing accessories include: i) at least one third transceiver configured to produce the mmWave frequency signals using the 5G protocols, ii) at least one third dielectric antenna in electrical communication with the at least one third transceiver for emitting the mmWave frequency signals according to the 5G protocols, iii) a third edge computing device having third processors and third non-transitory storages with third software to operate the third edge computing device in communication with the at least one third transceiver, and iv) at least one third power supply. The first software, the second software and the third software are configured to cause, when executed, the first plurality of integrated roofing accessories, the second plurality of integrated roofing accessories and third the plurality of integrated roofing accessories to form a 5G network using the mmWave frequency signals, and at least one of the first software, the second software, and the third software are further configured to cause, when executed, the 5G network to communicate with at least one computing device.

Another illustrative embodiment of the present description provides a method that includes at least: obtaining a first plurality of integrated roofing accessories, including: i) at least one first transceivers configured to produce mmWave frequency signals using 5G protocols, ii) at least one first dielectric antenna in electrical communication with the at least one first transceiver for emitting the mmWave frequency signals according to the at least one 5G protocol, and iii) a first edge computing device having at least one first processor and at least one first non-transitory storage with software. The systems and methods include mounting the first plurality of integrated roofing accessories on a first roof. Further included is obtaining a second plurality of integrated roofing accessories, including: i) at least one second transceiver configured to produce the mmWave frequency signals using the at least one 5G protocol, ii) at least one second dielectric antenna in electrical communication with the at least one second transceiver for emitting the mmWave frequency signals according to the at least one 5G protocol, and iii) a second edge computing device having at least one second processor and at least one second non-transitory storage with software. The systems and methods include mounting the second plurality of integrated roofing accessories on a second roof. Further included is obtaining a third plurality of integrated roofing accessories, including: i) at least one third transceiver configured to produce the mmWave frequency signals using the at least one 5G protocol, ii) at least one third dielectric antenna in electrical communication with the at least one third transceiver for emitting the mmWave frequency signals according to the at least one 5G protocol, and iii) a third edge computing device having at least one third processor and at least one third non-transitory storage with software. The systems and methods include mounting the third plurality of integrated roofing accessories on a third roof. The first software, the second software and the third software are configured to cause, when executed, the first plurality of integrated roofing accessories, the second plurality of integrated roofing accessories and third the plurality of integrated roofing accessories to form a 5G network using the mmWave frequency signals, and at least one of the first software, the second software, and the third software are further configured to cause, when executed, the 5G network to communicate with at least one computing device.

Another illustrative embodiment of the present description provides a method that includes at least: controlling, by at least one first processor of at least one edge computing device of at least one first plurality of integrated roofing accessories, at least one first transceiver to produce mmWave frequency signals using at least one 5G protocol, where the first plurality of integrated roofing accessories are installed on a first roof. At least one first dielectric antenna is controlled by the at least one first transceiver to emit the mmWave frequency signals according to the at least one 5G protocol. Further included is controlling, by at least one second processor of at least one edge computing device of at least one second plurality of integrated roofing accessories, at least one second transceiver to produce the mmWave frequency signals using the at least one 5G protocol, where the second plurality of integrated roofing accessories are installed on a second roof. At least one second dielectric antenna is controlled by the at least one second transceiver to emit the mmWave frequency signals according to the at least one 5G protocol. Further included is controlling, by at least one third processor of at least one edge computing device of at least one third plurality of integrated roofing accessories, at least one third transceiver to produce the mmWave frequency signals using the at least one 5G protocol, where the third plurality of integrated roofing accessories are installed on a third roof. At least one third dielectric antenna is controlled by the at least one third transceiver to emit the mmWave frequency signals according to the at least one 5G protocol. The at least one first processor, the at least one second processor and the at least one third processor, produces a 5G network using the mmWave frequency signals, and at least one of the at least one first processor, the at least one second processor and the at least one third processor cause the 5G network to communicate with at least one computing device. The systems and methods of some embodiments further include where at least one of the at least one first integrated roofing accessory, the at least one second integrated roofing accessory, or the at least one third integrated roofing accessory is integrated into at least one modified photovoltaic module.

The systems and methods of some embodiments further include where the at least one modified photovoltaic module includes at least one photovoltaic panel.

The systems and methods of some embodiments further include where the at least one of the at least one first transceiver, the at least one second transceiver, or the at least one third transceiver includes a software-defined radio module.

The systems and methods of some embodiments further include where the software-defined radio module includes a virtual firewall.

The systems and methods of some embodiments further include where the 5G network is defined according to an Open Systems Interconnection (OSI) model.

The systems and methods of some embodiments further include where the at least one first integrated roofing accessory further includes: a compartment, holding: i) the at least one first transceiver, ii) the at least one first dielectric antenna, and iii) the at least one first edge computing device; where a portion of the compartment including a roofing material; and a frame connected to the compartment and to the first roof.

The systems and methods of some embodiments further include where the compartment extends vertically above the first roof.

The systems and methods of some embodiments further include where the frame is installed into a ridge vent of the first roof.

The systems and methods of some embodiments further include where the at least one first integrated roofing accessory further includes: a shingle, holding: i) the at least one first transceiver, ii) the at least one first dielectric antenna, and iii) the at least one first edge computing device.

The systems and methods of some embodiments further include where the at least one first dielectric antenna is a plurality of first dielectric antennas.

The systems and methods of some embodiments further include where the at least one first integrated roofing accessory further includes: a siding, holding: i) the at least one first transceiver, ii) the at least one first dielectric antenna, and iii) the at least one first edge computing device.

The systems and methods of some embodiments further include where at least one of the first software, the second software, or the third software are further configured to cause, when executed, the 5G network to communicate with at least one customer access radio enabled computing device.

The systems and methods of some embodiments further include where the customer access radio enabled device includes a WiFi communication module.

The systems and methods of some embodiments further include where the at least one first integrated roofing accessory includes a first data storage device and a first compute device; where the at least one second integrated roofing accessory includes a second data storage device and a second compute device; where the at least one third integrated roofing accessory includes a third data storage device and a third compute device; and where the first software, the second software and the third software are configured to cause, when executed, the at least one first integrated roofing accessory, the at least one second integrated roofing accessory and third the plurality of integrated roofing accessories to form a distributed datacenter across the 5G network.

The systems and methods of some embodiments further include a fiber optic connection between a backhaul network and at least one of the at least one first integrated roofing accessory, the at least one second integrated roofing accessory, or the at least one third integrated roofing accessory.

The systems and methods of some embodiments further include where the 5G network is a mesh network.

The systems and methods of some embodiments further include an array of photovoltaic panels; and where at least one of the at least one first integrated roofing accessory, the at least one second integrated roofing accessory, or the at least one third integrated roofing accessory is powered by the array of photovoltaic panels.

The systems and methods of some embodiments further include a mains power connection via a ridge vent; and where at least one of the at least one first integrated roofing accessory, the at least one second integrated roofing accessory, or the at least one third integrated roofing accessory is powered by the mains power connection.

BRIEF DESCRIPTION OF THE DRAWINGS

At least one embodiment of the disclosure is herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

FIGS. 7A and 7B depict example diagrams of an adjustable attachment for positioning an integrated roofing accessory on a roof in an adjustable fashion.

FIGS. 8A and 8B depict example diagrams of adjustable attachments for positioning multiple integrated roofing accessories on a roof in an independently or cooperatively adjustable fashion.

FIGS. 11A and 11B depict one or more embodiments of various illustrative attachment mechanisms for an integrated roofing accessory using a ridge vent.

FIG. 13 depicts another illustrative attachment mechanism for an integrated roofing accessory.

DETAILED DESCRIPTION

Figure 1:
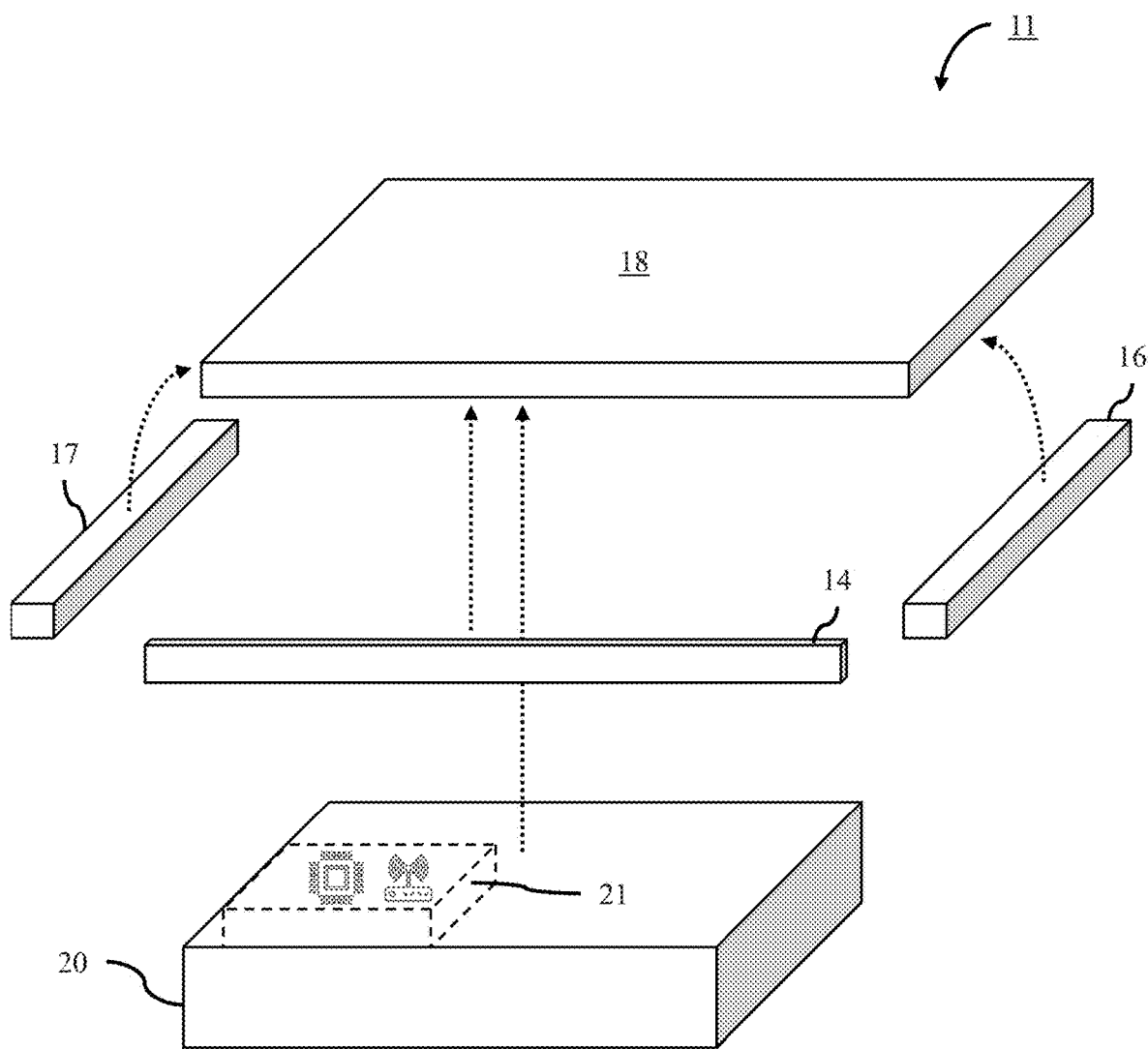
FIG. 1 depicts a non-limiting embodiment of an integrated roofing accessory according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references.

All prior patents, publications, and test methods referenced herein are incorporated by reference in their entireties.

Some embodiments of the present disclosure relate to methods and systems that include the least one integrated roofing accessory. As defined herein an "integrated roofing accessory" is a roofing accessory with at least one 5G-infrastructure-supporting ("5G-enabled") electronic component. In some embodiments, the at least one 5G-infrastructure-supporting electronic component is embedded within at least one roofing accessory component. In another embodiments, the at least one 5G-infrastructure-supporting electronic component is directly or indirectly attached to at least one roofing accessory component.

Some embodiments of the present disclosure relate to at least one integrated roofing accessory. Some embodiments of the present disclosure include a plurality of integrated roofing accessories. Some embodiments of the present disclosure include at least three integrated roofing accessories. Some embodiments of the present disclosure include at least five integrated roofing accessories. Some embodiments of the present disclosure include at least ten integrated roofing accessories. Some embodiments of the present disclosure include at least fifty integrated roofing accessories. Some embodiments of the present disclosure include at least one hundred integrated roofing accessories. Some embodiments of the present disclosure include at least one-thousand integrated roofing accessories.

In some embodiments, there are 1 to 10,000 integrated roofing accessories. In some embodiments there are 1 to 5000 integrated roofing accessories. In some embodiments, there are 1 to 1000 integrated roofing accessories. In some embodiments, there are 1 to 100 integrated roofing accessories. In some embodiments, there are 1 to 50 integrated roofing accessories. In some embodiments, there are 1 to 25 integrated roofing accessories. In some embodiments, there are 1 to 10 integrated roofing accessories. In some embodiments, there are 1 to 5 integrated roofing accessories. In some embodiments, there are 1 to 2 integrated roofing accessories.

In some embodiments, there are 2 to 10,000 integrated roofing accessories. In some embodiments, there are 5 to 10,000 integrated roofing accessories. In some embodiments, there are 10 to 10,000 integrated roofing accessories. In some embodiments, there are 50 to 10,000 integrated roofing accessories. In some embodiments, there are 100 to 10,000 integrated roofing accessories. In some embodiments, there are 500 to 10,000 integrated roofing accessories. In some embodiments, there are 1000 to 10,000 integrated roofing accessories. In some embodiments, there are 5000 to 10,000 integrated roofing accessories.

In some embodiments, there are 2 to 5000 integrated roofing accessories. In some embodiments, there are 5 to 1000 integrated roofing accessories. In some embodiments, there are 10 to 5000 integrated roofing accessories. In some embodiments, there are 50 to 100 integrated roofing accessories. In some embodiments, there are 60 to 90 integrated roofing accessories. In some embodiments, there are 70 to 80 integrated roofing accessories.

Non-limiting examples of the at least one roofing accessory component of the at least one integrated roofing accessory include: roofing caps, laminate roofing accessories, roofing sheets, ridge caps, ridge vents, roofing frames, roofing shingles and the like, or any combination thereof. Additional non-limiting examples of the at least one portion of the roofing accessory are found in U.S. Pat. Nos. 7,165,363 and 10,180,001, both of which are incorporated by reference in their respective entireties.

Non-limiting examples of the at least one electronic component of the at least one integrated roofing accessory include: at least one antenna, at least one solar array, at least one battery, at least one computing device, at least one controller, at least one processor, the like, or any combination thereof. The at least one electronic component may also include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. Additional examples of suitable electronic components can be found in US Patent Application Publication No. 2019/0123679, which is incorporated by reference herein in entirety.

As used herein, the term "dynamically" means that events and/or actions can be triggered and/or occur without any human intervention. In some embodiments, events and/or actions in accordance with the present description can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

FIG. 1 depicts a non-limiting exemplary embodiment of a 5G cell in having an integrated roofing accessory described herein. In the non-limiting exemplary embodiment, integrated roofing accessory 11 may be in a form of frame that may include at least one cover 18, and at least one electronics compartment 20, jointly referenced herein as the frame components. In some embodiments, the frame components may also include a front edge portion 14, a right edge portion 16, a left edge portion 17 and a back-edge portion (not shown). Together, the front edge portion 14, the right edge portion 16, the left edge portion 17 or back edge portion may form a frame to carry or enclose the cover 18 and electronics compartment 20. In some embodiments, the combination of the frame, the cover 18 and the electronics compartment 20 may form an integrated roofing accessory 11 that may be installed on a roof (a single 5G cell site) as a unit with or without additional integrated roofing accessories.

In some embodiments, the front edge portion 14, the right edge portion 16, the left edge portion 17 or back edge portion may be separately attachable to each other, to the cover 18, or both. However, in some embodiments, the front edge portion 14, the right edge portion 16, the left edge portion 17 or back edge portion are all fixed to each other, such as by being integrally formed together, fastened together with a suitable fastener (e.g., bolt, screw, rivet, pin, etc.), connected via an adhesive, or by some other method. The frame of the integrated roofing accessory 11 may then carry the cover 18 and/or electronics compartment 20. In some embodiments, the frame components may be made of any material. In some embodiments, the frame components include at least one of molded or extruded plastic, aluminum, a polymer composite material, the like, or any combination thereof.

In some embodiments, each of the cover 18, electronics compartment 20 and any other frame components may be integrally formed, e.g., by, for example, without limitation, molding or cutting the electronics compartment 20 into a material, such as, e.g., roofing material (e.g., a polymer or other suitable roofing material). Thus, the electronics of the electronics compartment 20 as well as the attachment mechanisms of the front edge portion 14, the right edge portion 16, the left edge portion 17 or back edge portion may be embedded into the material.

Figure 2:
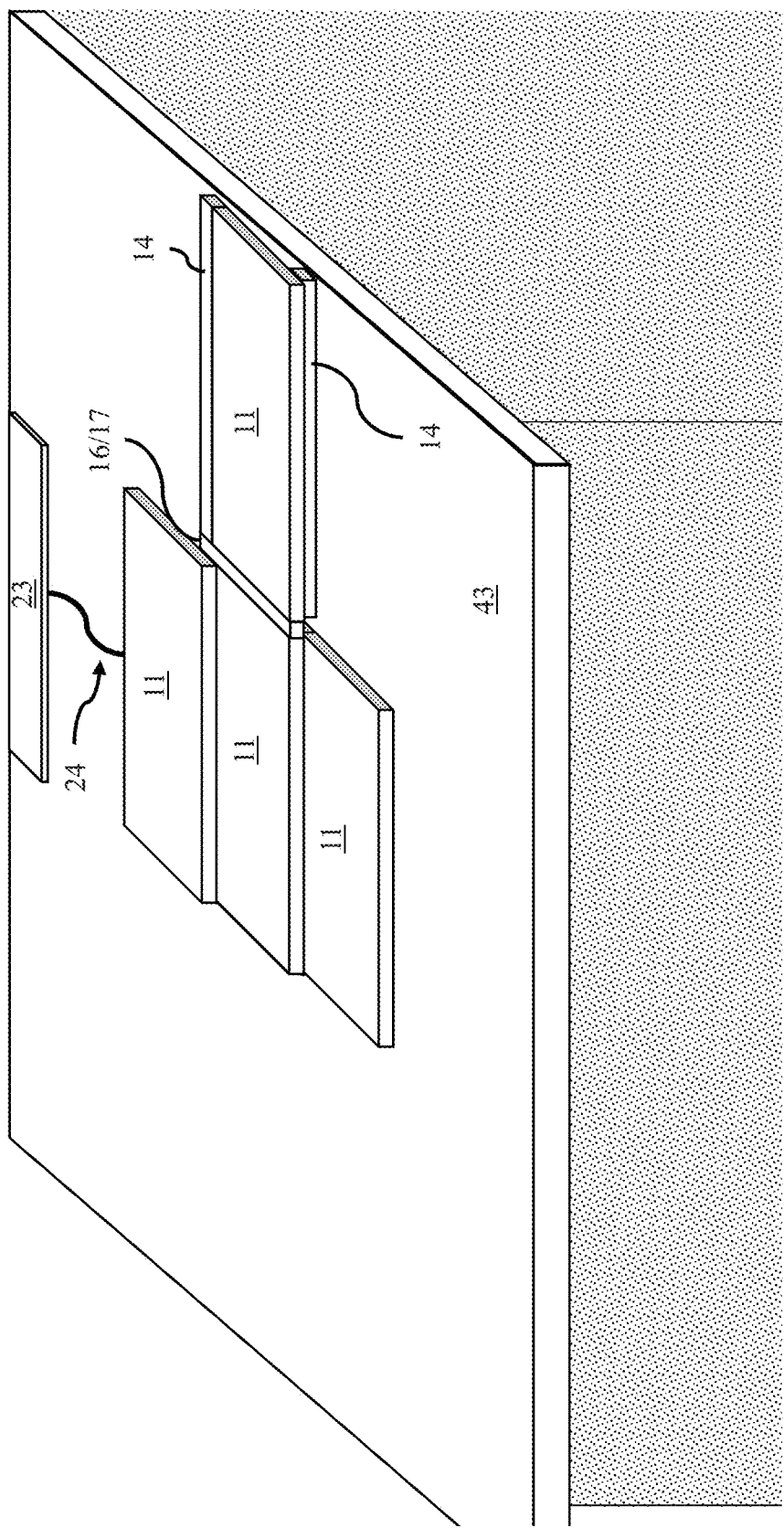
FIG. 2 depicts a non-limiting embodiment depicting the attachment of the integrated roofing accessory of FIG. 1 to a roof.

In some embodiments, the front edge portion 14, the right edge portion 16, the left edge portion 17 or back edge portion, or a combination thereof may be fixed to the cover 18 or removably attached. Moreover, as shown in FIG. 2, one or more roofing accessories 11 can be joined via one or more frame components (for example, without limitation, by one or more attachment mechanisms on the front edge portion 14, the right edge portion 16, the left edge portion 17 or back edge portion, or a combination thereof). For example, integrated roofing accessories 11 may be removable joined among themselves and/or removably joined to other roofing accessories and components, such as shingles, waterproofing membranes, underlayment, tiles, photovoltaic panels, among other suitable roofing accessories and components to cover a roof via, for example, without limitation, suitable mating mechanisms on one or more frame components (e.g., the cover 18) Various additional examples of the frame components that may be utilized to build and/or join the integrated roofing accessories 11 among themselves or to other roofing accessories, and their arrangements are disclosed in U.S. Pat. No. 9,169,646 which issued on Oct. 27, 2015; 9,273,885 which issued on Mar. 1, 2016; and 10,256,765 which issued on Apr. 9, 2019, all of which are incorporated herein by reference in their entirety for such specific purposes.

In some embodiments, at least one electronic component 21 is housed in the electronics compartment 20, which may be mounted to or recessed in the top surface of roof and mounted to or embedded into an underside of the cover 18. In some embodiments, cover 18 may be covered with a protective material chosen from at least one of, a polymer, an epoxy, the like, or combinations thereof. In some embodiments, the frame components may also include at least one additional electronics compartment (not shown), which may include at least one second electronic component and wiring to electrically connect the integrated roofing accessory 11 to additional roofing accessories and infrastructure (e.g., power source, photovoltaic panels, additional integrated roofing accessories 11, etc.). For example, one or more the frame components may be formed with a data bus or data bussed to enable electronic communication with mating busses of adjacent and/or attached additional roofing accessories. As such, electronic components 21 may interconnect with electronic components in other roofing accessories to create a system of interconnect roofing accessories.

In some embodiments, the cover 18 and electronics compartment 20 form a modified photovoltaic module of the integrated roofing accessory 11. For example, the modified photovoltaic module may have a photovoltaic panel employed as the cover 18. In some embodiments, the modified photovoltaic module includes a frame constructed from the frame components, and the electronic components 21 included within the electronics compartment 20. In some embodiments, electronics compartment 20 may be integrated into the photovoltaic panel, when such is utilized as the cover 18, or in one or more of the front edge portion 14, the right edge portion 16, the left edge portion 17 or back edge portion of the frame components. In some embodiments, the electronics compartment 21 may be an additional compartment enclosed within the integrated roofing accessory 11 (e.g., enclosed by one or more framing components (e.g., the cover 18)).

In some embodiments, the modified photovoltaic module may include a photovoltaic panel (as the cover 18), that may be modified to collocate 5G-enabled antennae with the photovoltaic panel, e.g., without limitation, by placing one or more antenna elements between photovoltaic cells of the photovoltaic panel, placing one or more antenna elements over or under photovoltaic cells of the photovoltaic panel, integrating antenna elements into the photovoltaic cells of the photovoltaic panel, or by another suitable technique. Accordingly, a 5G radio of the electronic components 21 may emit a signal via the photovoltaic panels using the collocated antennae.

In some embodiments, the integrated roofing accessory 11 may emit 5G signals using one or more antennae integrated into the cover 18. For example, a dielectric antenna may be embedded in a polymer sized to cover one or more frame components such as, without limitation, the electronics compartment 20. In some embodiments, the dielectric antenna may be a patch antenna, or other suitable antenna for embedding in the cover 18 such that the cover 18 may form an antenna module covering the electronic components 21 of the integrated roofing accessory 11. As a result, the cover 18 may serve as both a roofing accessory to weatherproof a roof of a house, as well as an antenna for a 5G network, as described below.

As shown in FIG. 2, the integrated roofing accessories 11 may be mounted onto a roof 43 using any suitable attachment mechanism such as fasteners (e.g., nails, screws, pins) and/or adhesives, or by attachment mechanisms mating to the attachment mechanisms of the frame components (left and right edge portions 16/17, front edge portion 14, and back edge portion (not shown)), such as the attachment mechanisms disclosed in U.S. Pat. Nos. 9,169,646, 9,273,885, and 10,256,765, incorporated by reference above. In some embodiments, the integrated roofing accessories 11 can be coated with asphalt before, during, or after installation. In some embodiments, the integrated roofing accessories 11 may be mounted on, under, or within one or more roofing materials. As used herein, the term "roofing material" includes, but is not limited to, shingles, waterproofing membranes, underlayment, tiles and photovoltaic panels.

In some embodiments, the integrated roofing accessories 11 on the roof 43 may electrically communicate with each other wirelessly or via a wired connection routed through the side portions 16/17 (e.g., via a bus, as described above). Accordingly, in some embodiments, one integrated roofing accessory 11 on the roof 43 can be connected to a power source, such as, e.g., via wiring 24 to a connection in a ridge vent 23 or to some other power source connection. However, in some embodiments, each roofing accessory 11 may be separately connected to the wiring 24 to the ridge vent 23.

In some embodiments, the at least one integrated roofing accessory may include electronics components 21 including a communication module that is configured to allow 5G signals to be transmitted. In some embodiments, the at least one integrated roofing accessory may include electronics components 21 including a communication module that is configured to allow 5G signals to be received. In some embodiments, the at least one integrated roofing accessory may include electronics components 21 including a communication module that is configured to allow 5G signals to be transmitted and received.

In some embodiments, the at least one integrated roofing accessory includes at least one embedded antenna. As used herein, the term "antenna" or "antennae" can refer to a device that is part of a transmitting or receiving system to transmit or receive wireless signals. In some embodiments, the at least one embedded antenna is configured to perform at least one of the following operations: receiving electromagnetic waves (e.g., 5G signals), transmitting electromagnetic waves (e.g., 5G signals), or any combination thereof.

In some embodiments, the at least one integrated roofing accessory is configured to support at least one signal propagation strategy. The at least one signal propagation strategy includes, but is not limited to, at least one of: many inputs-many outputs (MIMO), beam forming mesh, the like, or any combination thereof.

In some embodiments, the at least one embedded antenna is at least one dielectric antenna. In some embodiments, the at least one dielectric antenna takes the form of at least one dielectric antenna array. In some embodiments, the at least one dielectric antenna array includes a plurality of dielectric antennas configured to wirelessly receive a controllable beam in response to electromagnetic waves. In some embodiments, the at least one dielectric antenna array includes a plurality of dielectric antennas configured to wirelessly transmit a controllable beam in response to the electromagnetic waves. In some embodiments, the at least one dielectric antenna array includes a plurality of dielectric antennas configured to wirelessly transmit and receive a controllable beam in response to the electromagnetic waves.

In some embodiments, the dielectric antenna is embedded within the cover 18 or is covered by the cover 18 within the at least one recessed electronics compartment 19. Accordingly, the cover 18 may be constructed from a material that has a minimal effect on the 5G signals emitted by the dielectric antenna, such as a material that is transparent to mmWave signals, thus causing sufficiently low attenuation to the mmWave signals for a stable data transmission or reception. For example, the cover 18 may include a polymer, including engineered polymers, such as the D30™ Gear4™ and 5G Signal Plus material having microvoids for reducing mmWave attenuation, as disclosed by "D30 INTRODUCES 5G SIGNAL PLUS TECHNOLOGY", D30 Press Release, <https://www.d3o.com/partner-support/press-releases/d3o-introduces-5g-signal-plus/> (accessed, 1 Sep. 2020), herein incorporated by reference in its entirety. In some embodiments, the dielectric antenna is mounted on an exterior surface of the at least one frame 12, e.g., on an exterior of the cover 18 relative to the at least one recessed electronics compartment 19.

In some embodiments, the at least one integrated roofing accessory may include at least one of an embedded photovoltaic array (e.g., an array of photovoltaic panels), an embedded battery, or any combination thereof. In some embodiments, at least one of the embedded photovoltaic array, the embedded battery, or any combination thereof can dynamically supply power to roofing accessories and solutions.

In some embodiments, the embedded battery is configured to be charged by either the embedded photovoltaic array or an external power source. In some embodiments, the embedded battery is configured to deliver direct current (DC) power to devices or systems on or around a roof. In some embodiments, the embedded battery is configured to deliver alternating current (AC) power to devices or systems on or around a roof.

In some embodiments, the at least one integrated roofing accessory includes at least one of: at least one computing device, at least one storage component, or at least one memory component. In some embodiments, the at least one integrated roofing accessory is configured to dynamically carry out prescribed functions. In some embodiments, the at least one integrated roofing accessory is configured to be controlled remotely by a network operator or administrator (e.g., a 5G network), such as in a software defined network 30 as described below with reference to FIG. 3A. In some embodiments, the at least one integrated roofing accessory is configured to be controlled remotely by a wired connection. In some embodiments, the at least one integrated roofing accessory includes a base configuration. In some embodiments, the at least one integrated roofing accessory can be expanded from the base configuration.

Non-limiting examples of the at least one computing device include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like. Additional non-limiting examples of the at least one computing device include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Non-limiting examples of the at least one storage component or the least one memory component include: read only memory (ROM); random access memory (RAM); magnetic disk storage media; optical storage media; flash memory devices; electrical, optical, acoustical or other forms of propagated signals (e.g., carrier waves, infrared signals, digital signals, etc.), or any combination thereof.

In some embodiments, a plurality of integrated roofing accessories described herein can be installed on a plurality of roofs, so as to create an integrated roofing accessory network (5G network). In some embodiments, a plurality of integrated roofing accessories described herein can be installed on a single roof so as to create the integrated roofing accessory network.

In some embodiments, a method of using an integrated roofing accessory network described herein includes: providing a plurality of integrated roofing accessories as described herein; transmitting at least one electromagnetic signal (e.g., a 5G signal) from a first integrated roofing accessory; and receiving the at least one electromagnetic signal by a second integrated roofing accessory. In some embodiments, the second integrated roofing accessory further transmits the at least one electromagnetic signal to a third integrated roofing accessory, and so on. In some embodiments, the first integrated roofing accessory is located on a first building, the second integrated roofing accessory is located on a second building, the third integrated roofing accessory is located on a third building, and so on.

Figure 3A:
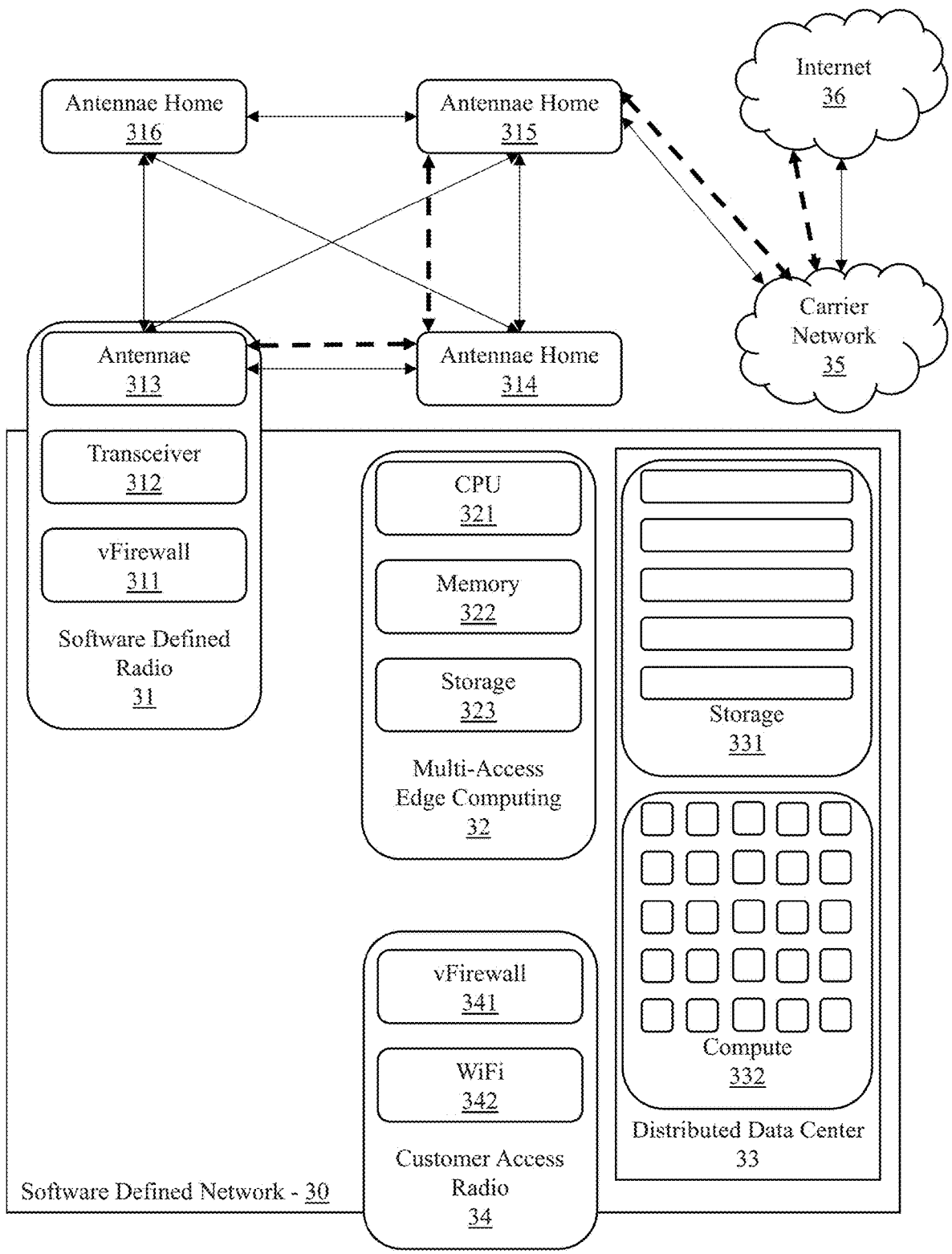
FIGS. 3A and 3B depict non-limiting embodiments depicting schematics of a 5G network employing antennae integrated into the integrated roofing accessory of FIG. 1.

FIG. 3A depicts a networking model incorporating a 5G-enabled integrated roofing accessory 11 according to aspects of embodiments of the present description.

In some embodiments, the integrated roofing accessory network may be configured to utilize Open Systems Interconnection (OSI) model, utilizing a flamework of standards for communication between different systems manufactured by different vendors, to communicate between integrating roofing accessories and other devices and/or systems (e.g., wireless carrier network, home network, etc.). The OSI model creates an open systems networking environment where any vendor's computer system, connected to any network, freely shares data with any other computer system on that network, or on a linked network.

Typically, the OSI model organizes the communication process into seven different layers of interrelated protocols in a layered sequence. Layers 1 through 3 define network access protocols and layers 4 through 7 deal with end-to-end communication protocols between a message source and a message destination. Each layer includes at least one function that is within an upper and a lower logical boundary. The services of each layer are combined with the services of lower layers to create new services that are made available to the higher layers. The layers include:

a. Layer 1 is a physical layer that responsible for the transmission and reception of unstructured raw data between a device and a physical transmission medium, including converting the digital bits into electrical, radio, or optical signals, with layer specifications defining characteristics such as voltage levels, the timing of voltage changes, physical data rates, maximum transmission distances, modulation scheme, channel access method and physical connectors;

b. Layer 2 is a data link layer that provides node-to-node data transfer via a link between two directly connected nodes, including detecting detects, and possibly correcting, errors that may occur in the physical layer, with definitions of the protocol to establish and terminate a connection between two physically connected devices, and the protocol for flow control between them;

c. Layer 3 is a network layer that provides the functional and procedural means of transferring variable length data sequences (called packets) from one node to another connected in "different networks" for routing and switching functions;

d. Layer 4 is a transport layer utilizing layers 1 to 3 to provide an end-to-end service having required characteristics for the higher layer functions, including the functional and procedural means of transferring variable-length data sequences from a source to a destination host, while maintaining the quality of service functions;

e. Layer 5 is a session layer that controls the dialogues (connections) between computers to provide the means to establish a session connection and to support an orderly exchange of data and related control functions for a particular communication service;

f. Layer 6 is a presentation layer that provides means for data formatting and code conversion to map the syntax and semantics to communication between application layer entities; and g. Layer 7 is an application layer that interacts with software applications that implement a communicating component, the protocols of which provide the actual service sought by an end user.

In some embodiments, the set-up of the exemplary integrated roofing accessory network in accordance with present disclosure may include software modules or combination software and hardware modules forming software-defined radio (SDR) 31 that include software that executes and assembles OSI layers 3-7 and transmission hardware (e.g., antennae 313 and transceivers 312) that execute OSI layers 1-2, or combinations of software and hardware.

In some embodiments, the integrated roofing accessories 11 may include hardware-based radio modules for interfacing with a 5G network. The radio modules may include circuitry for each of, e.g., amplifying, filtering, mixing, attenuating, etc. However, in some embodiments, the integrated roofing accessories employ SDR 31 modules. An SDR 31 module can be formed from hardware including a general-purpose processing device with software-based virtual signal processing components for amplifying, filtering, mixing, attenuating, etc. to produce the SDR 31 through virtual means.

In some embodiments, a basic SDR 31 module may include a processing device (e.g., central processing unit (CPU) or graphical processing unit (GPU)) equipped with an analog-to-digital converter, preceded by some form of RF front end. In some embodiments, the RF front end includes antennae 313 (e.g., one or more dielectric antennae or other suitable antenna types) and a transceiver 312. Significant amounts of signal processing are handed over to the general-purpose processor, rather than being done in special-purpose hardware (electronic circuits). Such a design produces a radio which can receive and transmit widely different radio protocols based solely on the software used.

In some embodiments, layer 1 of a software defined network 30 according to the OSI model layers can include the physical components of the integrated roofing accessories 11 and respective SDR 31 modules. In some embodiments, such physical components may include, e.g., one or more antennae 313. Each integrated roofing accessory 11 on each building may include physical antennae 314-316 to form a network of integrated roofing accessories 11 installed as roofing accessories throughout an area.

As described above, to improve signal density and signal number, as well as maximize the number of concurrent connections, the antennae 313 may include antenna elements positioned on a roof of a structure, such as house or building. In some embodiments, the antenna elements may be configured for 5G signaling. In some embodiments, the antennae 313 may include further elements for 4G signaling, or the 5G elements may be compatible with the frequencies for 4G.

In particular, in some embodiments, the integrated roofing accessories 11 may employ layer 1, or physical, components including antennae 313 to provide an uplink and downlink signal transmission method for random access, channel measurement, and terminal feedback in a cellular network using fifth generation (5G) frequency bands including unlicensed, licensed shared and extremely high frequency (EHF) bands, as well as any other 5G functionalities over 5G and mmWave frequency bands.

In some embodiments, the 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog or digital beam forming, or other signal propagation enhancements, and combinations thereof. Accordingly, the integrated roofing accessories 11 may include antennae 313 that incorporate such MIMO, FD-MIMO, array, beamforming and other technologies for improved mmWave signal propagation.

In some embodiments, such integrated roofing accessories 11 employ a physical antennae 313 to facilitate development of advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In a 5G system, such as one formed by a network of the integrated roofing accessories 11 (and, optionally, additional 5G-enabled devices and systems), Orthogonal Frequency Division Multiplexing (OFDM), hybrid frequency shift keying (FSK), quadrature amplitude modulation (QAM) (FQAM) and sliding window superposition coding (SWSC) may be employed individually or in combination as advanced coding modulation (ACM). In some embodiments, filter bank multi carrier (FBMC), non-orthogonal multiple access (NOMA), and sparse code multiple access (SCMA) as an advanced access technology may be incorporated instead or in addition.

Typically, in 5G communication, use of new frequency bands may be employed to obtain wider bandwidths for data rates of at least 1 Gbps. The mmWave frequency band in particular is a candidate for wide bandwidth transmissions. The mmWave frequency band is the 30 to 300 GHz band of the electromagnetic spectrum (10 to 1 mm wavelength). Accordingly, the antennae 313 may be configured for to emit and receive signals in the mmWave frequency band. Spectrum in traditional cellular bands, below 6 GHz (e.g., "5G(lite)"), is finite. As cellular data traffic continues to grow, new frequency bands may need to be considered for use. Unlike traditional cellular bands, mmWave bands may allow large blocks of contiguous spectrum to be allocated, allowing for bandwidths on the order of GHz or more. Moreover, the mmWave frequency bands may allow multi-element antenna arrays to be used.

Accordingly, in some embodiments, the antennae 131 may include multi-element antenna arrays, which may comprise very small elements, with sizes on the scale of integrated-circuit (IC) chip elements. Use of these multi-element antenna arrays may provide large antenna gain and sufficient power output through over-the-air power combining. This combination of large bandwidths and device architectures may allow mmWave antennae 131 to provide peak rates on the order of 10 Gbps and to provide ample capacity to meet the future demands.

However, in mmWave communication, power loss is large owing to attenuation of radio waves, limiting the transmission distance. Thus, in some embodiments, beamforming may be employed to overcome the limitation of short transmission distance. With beamforming, transmission power can be concentrated in a specific direction according to the configuration of a transmitting antennae 313. When receiving, the antennae 313 may also enhance performance in a specific direction with beamforming. Beamforming (or spatial filtering) is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity In some embodiments, the antenna elements of the antennae 313 may be controllable for MIMO signaling. In radio, multiple-input and multiple-output, or MIMO, is a method for multiplying the capacity of a radio link using multiple transmission and receiving antennas to exploit multipath propagation. The MIMO is a space-time signal processing where a natural dimensional of transmitting data is complemented with a spatial dimension inherent in the use of multiple spatially distributed antennas. MIMO is able to turn multipath propagations into a benefit because signals on the transmit antennas at one end and the receiver antennas at the other end are integrated such that a quality of bit error rate (BER) or a data rate of the communication for each wireless user or a transmitting distance is improved, thereby increasing a communication network's quality of service.

A MIMO channel contains many individual radio links, hence it has NtxNr SISO (Single-Input Single-Output) channels (also called sub-channels), where Nt refers to a number of transmit channels, and Nr refers to a number of receive channels. For example, a 2×2 MIMO arrangement contains 4 links and hence 4 SISO channels. The SISO channels can be combined in various ways to transmit one or more data streams to the receiver. Thus, the antenna elements may be separate, individually controllable antennae 313, or sub-elements of a single antennae 313, or a combination thereof, that together may communicate data. In some embodiments, the antennae 313 may include MIMO signaling capabilities include, e.g., 2×2, 4×4, 6×6, 8×8 or more SISO channels. For example, the antennae 313 may include, e.g., phased array antennae for MIMO and microwave signal generation, including, loop and/or patch antenna elements integrated into a printed circuit board (PCB) and embedded in the integrated roofing accessory 11. For example, a wideband polarized patch antenna and in an antenna array that can cover mmWave frequency bands 5G applications may be employed and may be single or dual-polarized. One embodiment the antenna package may a high-density interconnected (HDI) FR-4 printed circuit board (PCB) substrate, or other suitable wideband mmWave antenna array having a size to fit within the integrated roofing accessory 11 described above.

Long-Term Evolution (LTE), or 4G, is a standard developed by the 3GPP (3rd Generation Partnership Project) for wireless broadband communication for mobile devices and data terminals, based on the Global System for Mobile Communications (GSM)/Enhanced Data Rates for Global Evolution (EDGE) and Universal Mobile Telecommunications System (UMTS)/High Speed Packet Access (HSPA) technologies. It increases the capacity and speed using a different radio interface together with core network improvements over prior (3G) standards. However, Worldwide Interoperability for Microwave Access (WiMAX), Evolved HSPA (HSPA+), and LTE may be included as 4G technologies. Accordingly, the antennae 313 may additionally include GSM, EDGE, UMTS and HSPA frequencies in addition to mmWave frequencies as described above. For example, such 4G frequencies may have better range and penetration for reduced signal blockage and dissipation, thus improving long range stability. Accordingly, the 4G antenna element so the antennae 313 may be used for, e.g., backhaul communication or other long-range uses.

In some embodiments, the antennae 313 may be positioned in a location to provide the best line-of-sight to both other antennae 314 through 316 as well as 5G-enabled computing devices. Both height and orientation may play in a role in providing line-of-sight to other devices, with a high location facilitating raising the antennae 313 above potential obstructions. Accordingly, as described above, installation as a roofing accessory on residential or commercial roof may provide positioning for facilitating mesh networking with additional antennae 314 through 316 as well as 5G signaling for data transmission to and from computing devices.

Moreover, mmWave antennae 313 may require power to operate, and sometime significant amount of power. Indeed, greater power supply may improve signal propagation, or distance with which a signal may maintain throughput and stability. Installation as a roofing accessory facilitates providing roof-mounted photovoltaic panels or mains power, e.g., via a ridge vent or other similar access structure.

In some embodiments, level two components in a module of the SDR 31 and software defined network 30 can include data link components such as, e.g., a receiver, transmitter, transceiver 312 or combination thereof. In some embodiments, the transceiver 312 may be included in the electronic devices of the integrated roofing accessory 11 to control the antennae 313 for frequency control and modulation of emitted signals. Such a transceiver 312 may be selected or configured to balance complexity of signals and density or number of concurrent connections or channels with computational complexity, heat and size. In some embodiments, these factors may be balanced to achieve an optimal balance that maximizes signal complexity and number of concurrent connections while maintaining a size and heat output that is sustainable within an integrated roofing accessory 11.

Similarly, cost and circuit complexity/heat output may be balanced against power supply and amplitude of the antennae 313. As more power is supplied, the transceiver 312 may generate more heat and consume more energy, but signal propagation may be extended. Additionally, a higher quality, more sensitive and complex transceiver 312 may improve signal-to-noise ratios for better signal stability and data transmission.

In some embodiments, the transceiver 312 plays an active role in the SDR 31 by effectuating at least four sub-layers to the OSI Model layer 2, including, e.g., Service Data Adaptation Protocol (SDAP), Packet Data Convergence Protocol (PDCP), Radio Link Control, Medium Access Control, among others.

The medium access control (MAC) sublayer is the layer that controls the hardware responsible for interaction with the wired, optical or wireless transmission medium. The MAC sublayer and the logical link control (LLC) sublayer together make up the data link layer. Within the data link layer, the LLC provides flow control and multiplexing for the logical link (i.e. EtherType, 802.1Q VLAN tag etc.), while the MAC provides flow control and multiplexing for the transmission medium.

RLC is located on top of the 3GPP MAC-layer and below the PDCP-layer. The main tasks of the RLC protocol are: Transfer of upper layer Protocol Data Units (PDUs) in one of three modes: Acknowledged Mode (AM), Unacknowledged Mode (UM) and Transparent Mode (TM); Error correction through ARQ (only for AM data transfer); Concatenation, segmentation and reassembly of RLC SDUs (UM and AM); Re-segmentation of RLC data PDUs (AM); Reordering of RLC data PDUs (UM and AM); Duplicate detection (UM and AM); RLC SDU discard (UM and AM); and RLC re-establishment.

Protocol error detection and recovery Packet Data Convergence Protocol (PDCP) is specified by 3GPP in TS 25.323 for UMTS, TS 36.323 for LTE and TS 38.323 for 5G New Radio (NR). PDCP is located in the Radio Protocol Stack in the UMTS/LTE/5G Air interface on top of the RLC layer.

A SDAP sub-layer is above the PDCP sublayer in 5GNR. PDCP is the first sublayer in the 3GPP protocol stack that receives/transmits network layer traffic (TCP/IP traffic). Data Radio Bearer (DRB) is the logical connection used inside the 5G protocol stack to carry data PDUs. SDAP functionality is to map quality-of-service (QoS) flow to and from DRB at the PDCP sublayer in both downlink and uplink direction. The main services and functions of SDAP include the following: mapping between a QoS flow and a data radio bearer; marking QoS flow ID (QFI) in both DL and UL PDUs; and mapping the flow to one of the uplink DRB. Similarly, when a downlink PDU is received at the PDCP and it contains SDAP header which is removed, and the PDU is passed to upper layer.

Accordingly, in some embodiments, the transceiver 312 controls the antennae 313 for efficient transmission via, e.g., beamforming and MIMO functionality as described above. A beamforming protocol, such as that defined as part of the proposed IEEE 802.11 ad/WiGig standard, may be used to find a path between a cooperating pair of transmitter and receiver antennas. Beamforming techniques in mmWave systems are complex and require significant computing overhead to accomplish.

In some embodiments, the transceiver 312 may, therefore, include a selection from transceivers and/or modems integrated or embedded in integrated circuit or system-on-chip design. For example, a 5G modem, such as the Qualcomm Snapdragon™ X50, X52 and/or X55 modems, Analog Devices Inc. AD9375, or other suitable modem and transceiver solutions suitable to be integrated into an integrated roofing accessory 11 for an SDR 31.

In some embodiments, the antennae 313 and 312 may be packaged in, e.g., an embedded solution, such as a system-on-chip architecture, however other integrate circuit packaging methodologies may be employed to package the antennae 313 and transceiver 312 under the cover 18 in an electronics compartment 20 as the first electronic device and/or the at least one second electronic device 21. In some embodiments, the antennae 313 are separate from the transceiver 312 and in electronic communication with each via, e.g., copper wiring, or other wiring solution, or via a standardized data interface such as, e.g., PCIe, SATA, NVME, USB, ethernet, Registered Jack (e.g., RJ11), or other data communication interface, such as the wiring 22.

In some embodiments, as a separate electronic device or integrated into the system-on-chip of the transceiver 312, the SDR 31 may optionally include a virtual firewall (vFirewall) 311. In some embodiments, the vFirewall 311 may regulate data communication between the transceiver 312 and the software defined network 30 to prevent untrusted or unauthorized data, files, programs, scripts and other information from harming the software defined network 30 and software and hardware components therein.

In some embodiments, the vFirewall 311 may include a network firewall service or appliance running entirely within a virtualized environment and which provides the usual packet filtering and monitoring provided via a physical network firewall. The vFirewall 311 can be realized as a traditional software firewall on a guest virtual machine already running, a purpose-built virtual security appliance designed with virtual network security in mind, a virtual switch with additional security capabilities, or a managed kernel process running within the host hypervisor.

In some embodiments, the vFirewall 311 may operate in different modes to provide security services, depending on the point of deployment. For example, the vFirewall 311 may operate in either bridge-mode or hypervisor-mode. Both may come shrink wrapped as a virtual security appliance and may install a virtual machine for management purposes.

A virtual firewall operating in bridge-mode acts like its physical-world firewall analog; it sits in a strategic part of the network infrastructure usually at an inter-network virtual switch or bridge—and intercepts network traffic destined for other network segments and needing to travel over the bridge. By examining the source origin, the destination, the type of packet it is and even the payload the VF can decide if the packet is to be allowed passage, dropped, rejected, or forwarded or mirrored to some other device. Initial entrants into the virtual firewall field were largely bridge-mode, and many offers retain this feature.

By contrast, a virtual firewall operating in hypervisor-mode is not actually part of the virtual network at all, and as such has no physical-world device analog. A hypervisor-mode virtual firewall resides in the virtual machine monitor or hypervisor where it is well positioned to capture VM activity including packet injections. The entire monitored VM and all its virtual hardware, software, services, memory and storage can be examined, as can changes in these. Further, since a hypervisor-based virtual firewall is not part of the network proper and is not a virtual machine its functionality cannot be monitored in turn or altered by users and software limited to running under a VM or having access only to the virtualized network.

In some embodiments, because the vFirewall 311 is positioned in the SDR 31 at the intersection between the software defined network 30 and other antennae 314 through 316 of a 5G mesh network, the vFirewall 311 may be configured to operate in bridge mode.

In some embodiments, as a SDR 31, the transceiver 312 and vFirewall 311 may be implemented as software components within a general-purpose processing device, such as, e.g., a central processing unit (CPU) (e.g., an x86, x64, ARM, RISC-V, PowerPC, MIPS, SPARC, or other complex instruction set computer (CISC) or reduced instruction set computer (RISC) processors), graphical processing unit (GPU), neural processing unit (NPU), field programmable gate array (FPGA), microprocessor, or other processing device or combinations thereof. In some embodiments, different functions of the transceiver 312 and vFirewall 311 may be configured to be implemented with separate processing components of processor package including multiple processing devices, processing or compute cores, or combinations thereof. For example, the processor package may include, e.g., one or more CPU cores, one or more GPU cores, one or more NPU cores, a digital-to-analog (DAC) converter, an analog-to-digital converter (ADC), a 5G model including radio-frequency receiver, transmitter and/or transceiver, cache, on chip storage, random access memory (RAM), as well as data interfaces to interface with one or more additional processor devices, components or packages as well as to interface with the antennae 313 via the transceiver 312.

In some embodiments, the processing components of the SDR 31 may additionally be configured to integrate the SDR 31 into one or more networks, including the software defined network 30 and a 5G mesh network incorporating additional antennae 314 through 316 from additional integrated roofing accessories 11 and additional 5G-enabled computing devices, as well as any other suitable network. Accordingly, the SDR 31 may cooperate with, e.g., the software defined network 30 to implement networking and communication protocol layers of the OSI Model. For example, such layers may include layer 3 for networking, layer 4 for transport and layer 5 for session control and configuration. Such layers facilitated the SDR 31 to communicate with other antennae 314 through 316 even where the other antennae 314 through 316 are manufactured and programmed by different entities or using different software and firmware.

In some embodiments, the software defined network 30 implements layers 3 through 5 to establish a platform or standard network to integrate the SDR 31 into compute and communication resources. In some embodiments, the software defined network 30 implements the layers 3 through 5 to operate as a control layer for all communication between sub-systems or electronics modules of the software defined network 30 (including, e.g., the SDR 31 module), multi-access edge computing 32, distributed data components 33, consumer access radio 34 (e.g., WiFi, Bluetooth, Zigbee, Z-Wave, 4G/LTE, 5G(lite), 3G, etc.), among other sub-systems and electronics modules of the integrated roofing accessory 11 and devices in communication therewith.

In some embodiments, the software defined network 30 may integrate the sub-systems and electronics modules into a single system by defining the data traffic within the software defined network 30, e.g., using software-defined common resource management (SD-CRM). The SD-CRM can be used for networking functions and application/service functions. Thus, the SD-CRM can manage transport functions for layers zero through four as well as application functions for layers four and higher. The SD-CRM can provide a platform for network services, network control of service instantiation and management, as well as a programmable environment for resource and traffic management. The SD-CRM also can provide a consolidated network management interface to permit the combination of real time data from the service and network elements with real-time or near real-time control of the forwarding plane. Thus, embodiments of the concepts and technologies described herein can enable near real-time configuration and real-time flow setup, programmability through service and network script-like logic, extensibility for competitive differentiation, standard interfaces, and multi-vendor support, among other features. Interactions between these layers can be based upon policies to determine optimum configuration and rapid adaptation of the network to changing state and changing customer requirements for example, spikes in traffic, network outages (e.g., due to snow storms, blackouts, natural disasters, or the like), adding new services (e.g., VoIP/web RTC, authentication, etc.), maintenance, combinations thereof, or the like.

Accordingly, in some embodiments, the SD-CRM may define what communication will run over each SDR 31 module on the software defined network 30 (e.g., the SDR 31, the customer access radio 34, among others). In some embodiments, the software defined network 30 may extend to additional integrated roofing accessories 11 to incorporate the SDRs therein into a common software defined network 30. As a result, the SD-CRM may control traffic between the various SDRs 31 of the various integrated roofing accessories 11 to form a distributed computing environment for control of multiple SDR 31 modules to cooperate within a cohesive 5G network. Thus, multiple integrated roofing accessories 11 may be combined to create a larger antenna structure, facilitating modular functionality. In some embodiments, once a 5G network is created, the SD-CRM defines the traffic that traverses it.

Figure 3B:
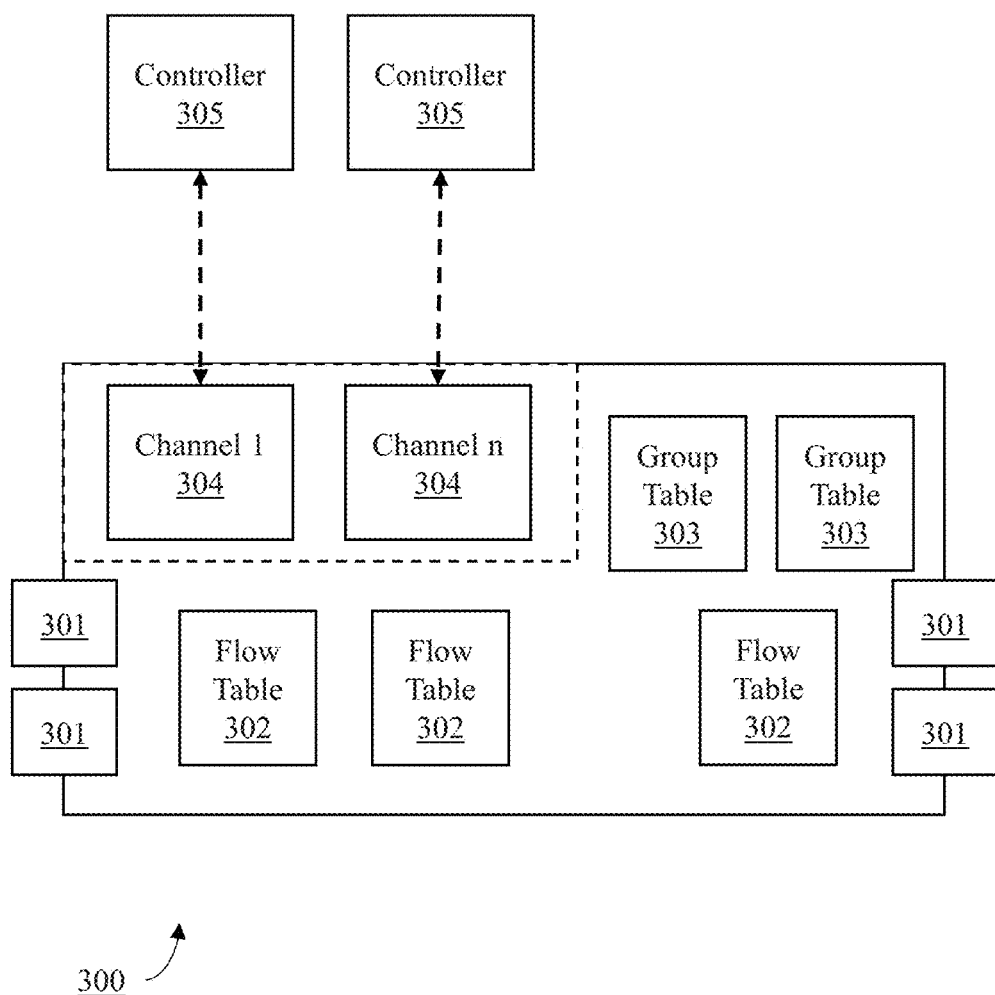

In some embodiments, the SD-CRM of the software defined network 30 may be implemented with, e.g., a network switch 300 as shown in FIG. 3B. In some embodiments, the network switch 300 may be configured to manage a software defined network 30 according to a network protocol, such as, e.g., the OpenFlow protocol, Accordingly, the network switch 300 may be a software defined (e.g., logical) switch protocol defined by one or more controllers 305. In some embodiments, however, the switch 300 may be a hardware switch or embodied in a specialized hardware device, such as, e.g., a single or multiport Ethernet switch (e.g., a Zodiac FX™ or other similar Ethernet switch), or other network switch device or devices.

In some embodiments, the network switch 300 may include one or more flow tables 302 and group tables 303, which perform packet lookups and forwarding, and one or more channels 304 to the external controller or controllers 305. The switch 300 communicates with the controllers 305 and the controllers 305 manage the switch 300 via the switch protocol by, e.g., adding, updating and deleting flow entries in flow tables 302.

In some embodiments, the switch 300 includes multiple flow tables 303. Thus, upon receiving packets of network traffic via one or more of the ports 301, the packets are compared in to entries in each flow table 302 starting with the first flow table and may continue to additional flow tables of the pipeline. The packet may first start in a table 0 and check those entries based on priority. Highest priority will match first (e.g. 200, then 100, then 1). If the flow needs to continue to another table, the packet may be advanced to the table specified in the instructions until a match is found, and the corresponding instructions are executed.

In some embodiments, the ports 301 may include physical and/or logical ports. Examples of hardware ports may include, e.g., ethernet interfaces, while logical ports may include, e.g., LGs, tunnels, loopbacks and other logical interfaces.

Referring again to FIG. 3A, the software defined network 30 may include the incorporation of data storage and compute resources. For example, a multi-access edge computing (MEC) 32 system may be employed in each integrated roofing accessory 11 or in communication with each integrated roofing accessory 11 as part of the software defined network 30. In some embodiments, the MEC 32 may include a CPU 321, a memory 322, a non-transitory storage device 323 among other processing devices and components (e.g., GPUs, NPUs, codecs, DAC, ADC, etc.). In some embodiments, the MEC 32 is integrated onto the same board or PCB as the SDR 31 module such that, e.g., compute, memory and/or storage resources are shared. However, in some embodiments, the MEC 32 may be a separate set of processing resources relative to the SDR 31 module.

In some embodiments, the MEC 32 may control the software defined network 30, including, e.g., implementing layers 3 through 5, and/or layers 6 and 7 for data presentation and application functionality, respectively. For example, the MEC 32 may provide a user application functionality to administer network protocols, security policies, flow tables, group tables, among other software administration functionalities pertaining to the implementation of layers 1 through 5 described above. Accordingly, the MEC 32 is effectively the control module for the software defined network 30 implemented by one or more integrated roofing accessories 11 with user definable policies via, e.g., suitable user interfaces. Such user interfaces may provide the user with administrative functionality to control the software defined network 30 and components therein, as well as to collect and locally store data and service metrics relative to the operation of the components and the software defined network 30. Thus, the MEC 32 may include a suitable processing package including the CPU 321, memory 322 and non-transitory storage device 323 for generating and providing to a user the user interface in a network management console. Such processing package may include, e.g., PCB mounted CPU 321, memory 322 and non-transitory storage device 323 and/or a system-on-chip, and/or other suitable processing package. For example, the MEC 32 may include, e.g., a Raspberry Pi, Arduino, Nvidia TX2, or other configurable processing package.

In some embodiments, multiple integrated roofing accessories 11 with respective antennae 313 through 316 may be networked together using 5G signals to create a broader software defined network 30. Such a broader network may be leveraged to implement a distributed datacenter 33 across the integrated roofing accessories 11 on the network. Accordingly, the software defined network 30 may be configured to share storage 331 and compute 332 resources for distributed processing and storage of user data, e.g., received via the customer access radio 34 and shared across integrated roofing accessories 11 via antennae 313 through 316. Such a distributed datacenter 33 may be employed for, e.g., cloud storage, media and data streaming, content distribution (e.g., as a content distribution network (CDN)), among other distributed applications.

In some embodiments, a user may interface directly with the software defined network 30 via a 5G connection using a 5G-enabled computing device, or via the customer access radio 34 via a customer access radio enabled device. In some embodiments, the customer access radio 34 includes, e.g., a WiFi radio 342. The customer access radio enabled device may include any computing device having hardware and/or software for communicating with the WiFi radio 342. Accordingly, the integrated roofing accessory 11 using the software defined network 30 may include both 5G connectivity as well as WiFi connectivity or other customer access wireless protocol connectivity, for example, for in-home WiFi using the same integrated roofing accessory 11 that provides 5G carrier or internet-service-provider (ISP) connectivity. In some embodiments, similar to the SDR 31, the customer access radio 34 may include a vFirewall 342 to enhanced security of the software defined network 30.

In some embodiments, the storage 331 may be implemented with suitable storage components such as, e.g., a series for solid state drives (SSD) or M.2 storage drives. M.2 drives are a newer, smaller, and faster variant of an SSD. The storage 331 subsystem may be configured in a Redundant Array of Independent Drives (RAID) variant (5 or 10) or as a Hadoop Distributed Files System (HDFS). Either system provides a level of data security and fault tolerance. HDFS has an advantage with error checking and the ability to assign multiple namenodes. Namenodes are simply indexes to where the data resides. Data Nodes can be configured to store multiple copies of the data across several drives. Namenodes manage data on the data nodes by sector—more granular and removes the need to remove an entire drive from the system like a RAID array. Depending on the RAID level it allows for one or two drive failures and still have the system function normally. However, an additional drive failure would cause catastrophic data loss. So, to prevent data loss, drives will need to be continually replaced.

In comparison, HDFS allows for sector level management per drive. Using HDFS, multiple drives failures does not cause catastrophic failure/data loss. HDFS storage management concern may be on the overall capacity of the system and namenode versus physical drive failure. Therefore, an HDFS managed storage solution may reduce the time and effort required to support an integrated roofing accessory 11 platform.

In some embodiments, complimentary to datacenter 33 storage 331 is compute 332. Compute 332 allows applications and services to be written and operate within a distributed space. Like a typical datacenter or cloud infrastructure, compute 332 may enable services to be deployed across a distributed network. Unlike primary cloud networks, the distributed datacenter 33 of the integrated roofing accessories 11 may not have defined services or applications. Rather, the distributed datacenter 33 may employ compute 332 to have a hypervisor-like service to manage and deploy infrastructure for the user. In some embodiments, each integrated roofing accessory 11 may be a network of dense single board computers (SBC) with multiple cores or embedded servers. Advantageously, such compute 332 solutions may be resilient to extreme environmental conditions, such as, e.g., high temperatures, low temperatures, moisture and humidity, vibrations, shock, among other environmental conditions. An example of a possible SBC or embedded server may include, e.g., a Grizzly VL-ESU-5070, or other suitable device.

In some embodiments, to support data science workloads, pipelines and models Graphical Processing Units (GPU) may be deployed within the integrated roofing accessory 11 in the software defined network 30 in much the same manner as the CPU. An example SBC that supports high density GPU may include, e.g., Nvidia Jetson Nano or other suitable device.

In some embodiments, the software defined network 30 within and across integrated roofing accessories 11 may be included with a power source. In some embodiments, low-power devices may be employed, such as, e.g., systems-on-chip similar to those used in smartphones and other mobile devices. Accordingly, power may be provided via, e.g., on-board batteries, photovoltaic panel mounted to the same roof as the integrated roofing accessory 11 or as a cover 18 on the integrated roofing accessory 11. However, in some embodiments, to achieve greater range and stability of the 5G signal, high power components for a more powerful SDR 31 may be employed. Accordingly, in some embodiments, the integrated roofing accessories 11 may be connected directly to mains power via, e.g., an AC to DC (AC/DC) converter, or to a larger scale solar array installed on the roof or nearby, or both.

In some embodiments, various components and devices, including 5G-enabled computing devices and 5G-enabled integrated roofing accessories 11 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile device, messaging device, data communication device, and so forth.

As used herein, the term "mobile device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the processing device may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) NET Framework; (36) Silverlight; (37) Open Web Platform; (38) Oracle Database; (39) Qt; (40) SAP NetWeaver; (41) Smartface; (42) Vexi; and/or (43) Windows Runtime.

In some embodiments, devices and components of the integrated roofing accessories 11 of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, various devices and components of the integrated roofing accessories 11, such as the MEC 32, may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

Figure 4A:
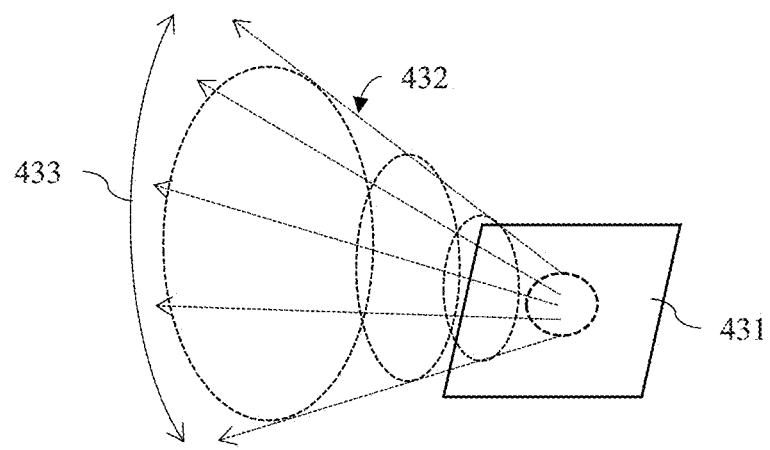
FIGS. 4A and 4B depict non-limiting embodiments depicting arrangements of integrated roofing accessories of FIG. 1 on residential roofs.

FIG. 4A depicts an example 5G transmission signal emitted from an antenna 431 of an integrated roofing accessory 11 in accordance with aspects of embodiments of the present description.

In some embodiments, 5G antennae may be directional in nature, as described above, due to factors such as beamforming and antenna shape. Accordingly, an antenna 431 may emit a signal 432 in a conical "field-of-view" (FOV) within which the angular beam steering range 433 over which the antenna 431 can direct a beamformed signal 432. The signal 432 is formed as a beam and may be emitted in any direction within the limits of the FOV of the antenna. In some embodiments, the antenna 431 may have an FOV defined by the beam steering range 433, such as, e.g., within an angle of incidence within about 45 degrees, 60 degrees, 70 degrees, or 80 degrees of a normal incidence relative to a surface of the antenna 431, or other angle of incidence. Thus, the beam steering range 433 may cover angles of incidence across about, e.g., 90, 120, 140, 160 or other suitable range of angles of incidence of beamformed 5G signals emitted from the antenna 431.

Figure 4B:
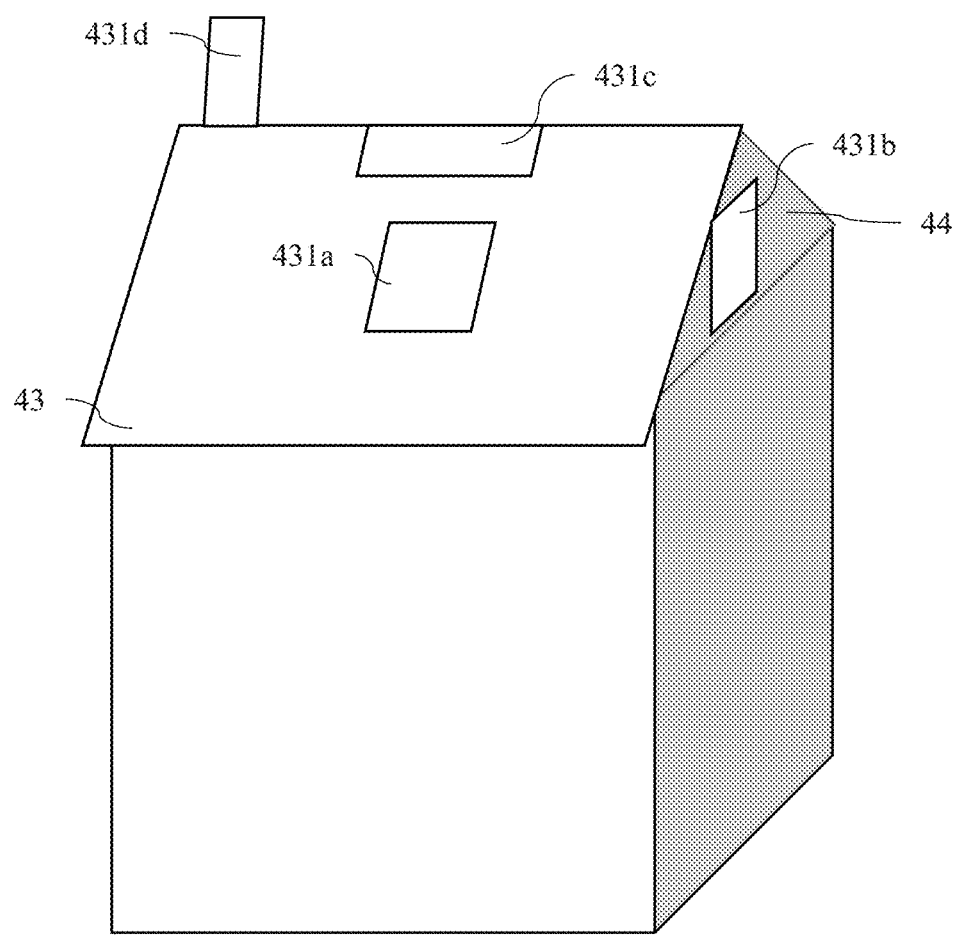

FIG. 4B depicts various integrated roofing accessory antenna placements relative to a roof of a structure in accordance with aspects of embodiments of the present description.

As described above, effectiveness of signal coverage in a physical area is affected by the orientation and position of 5G antennae due to the directional nature imposed by beamforming 5G signals. Accordingly, integrated roofing accessories 11 and associated antennae may be installed on a roof 43 as a roofing accessory in one or more of various positions and orientations to best suit the environment.

In some embodiments, an integrated roofing accessory 11 may include a coplanar integrated roofing accessory 431a. The coplanar integrated roofing accessory 431a is a roofing accessory shaped package that is installed alongside traditional roofing accessories or roofing material on the roof 43 of the structure 40. For example, the coplanar integrated roofing accessory 431a may have a shape matching the shingles of a residential home, thus forming a shingle for the roof, or integrated shingle. Thus, a top surface of the coplanar integrated roofing accessory 431a may be coplanar with the surrounding roofing material.

In some embodiments, the coplanar integrated roofing accessory 431a may have a thickness greater than the surrounding roofing material. In such a case, the coplanar integrated roofing accessory 431a may be inserted into a recess within the roof 43 such that a top surface of the coplanar integrated roofing accessory 431a is at a height above a top surface of the roof 43 that is coplanar with a top surface of the surrounding roofing material. However, in some embodiments, the coplanar integrated roofing accessory 431a may be installed on the top surface of the roof 43 such that the top surface of the coplanar integrated roofing accessory 431a rises to a height above the top surface of the roof 43 that is above a height of the top surface of the surrounding roofing material above the top surface of the roof 43.

In some embodiments, the coplanar integrated roofing accessory 431a may have the advantages of being roughly flush with the roof 43, providing a discrete device that homeowners or building owners would find less objectionable, and thus be more likely to install. However, the angle of a slope of the roof 43 direct a normal angle of incidence of an antenna of the coplanar integrated roofing accessory 431a upward. As a result, due to the beam steering range 433 of the coplanar integrated roofing accessory 431a being finite, the portion of the beam steering range 433 that can project a beam formed signal towards a device on the ground is reduced, resulting in less area that may be covered by the coplanar integrated roofing accessory 431a. Indeed, where the roof is horizontal, the beam steering range 433 may not extend even towards other integrated roofing accessories because the normal incidence would be directed vertically toward the sky.

Similarly, a ridge vent integrated roofing accessory 431c or front or back face siding integrated roofing accessory 431b may be employed that can be recessed into a surface of the structure 40 or mounted on the surface of the structure 40 for low profile and discrete installation. However, similar to the coplanar integrated roofing accessory 431a, the directional nature of the 5G antenna results in reduced sightlines afforded by the beam steering range 433, and thus reduced coverage. The ridge vent integrated roofing accessory 431c may have better coverage because it may be configured to have two antenna portions, with each portion aligning with the slopes of the roof 43 on each side of the ridge, thus multiplying the beam steering range 433. However, each antenna portion nevertheless may have reduced lines of sight to the ground where 5G-enabled devices may be located, thus reducing effective coverage in the area.

In some embodiments, to mitigate the coverage loss due to the directionally mounted coplanar integrated roofing accessory 431a, the siding integrated roofing accessory 431b and the ridge vent integrated roofing accessory 431c, multiple roofing accessories may be used on a single roof (5G cell site). For example, the coplanar integrated roofing accessory 431a may be installed on each roof slope of the roof 43, and the siding integrated roofing accessory 431b on each side of the structure, or on each face of the structure extending between roof slopes as a portion of the siding. In some embodiments, alternatively or in addition, to one or more coplanar integrated roofing accessories 431a, one or more siding integrated roofing accessories 431b, one or more ridge vent integrated roofing accessories 431c may be installed in the ridge vent of the roof 43. Thus, antennae from the various roofing accessories are angled in multiple directions to provide overlapping beam steering ranges 433 for increased coverage in an area around the structure 43.

Moreover, in some embodiments, the various roofing accessories can be integrated into a mesh network or a common software defined network, such as the software defined network 30 described above. As a result, the roofing accessories can share compute and storage resources, and behave as a cohesive system.

Additionally, or alternatively, each of the coplanar integrated roofing accessories 431a and siding integrated roofing accessories 431b may be antennae only or software define radios only, such as the antennae 313 and SDR 31 described above. Each coplanar integrated roofing accessory 431a and siding integrated roofing accessory 431b may interface with a hub roofing accessory in the ridge vent to centralize compute, storage, and user access radios in the ridge vent integrated roofing accessory 431c. Accordingly, each integrated roofing accessory may represent a modular component of an integrated roofing accessory 11 that may be separately detached and applied to various portions of the roof 43 to optimize coverage, while a control module including the centralized resources may be located in the ridge vent near access to power and infrastructure within the structure 40.

In some embodiments, a vertical attachment integrated roofing accessory 431d may be employed that extends up from the roof in a vertical direction above the ground and the roof 43. In some embodiments, the vertical attachment integrated roofing accessory 431d may have multiple vertically oriented faces, each having a horizontal angle of normal incidence relative to an antenna. For example, the vertical attachment integrated roofing accessory 431d may have a box configuration with four vertical faces, each vertical face including an antenna. However, any number of faces may be used, such as, e.g., 2, 3, 4, 5, 6, 7, 8, 9, 10 or more faces. In some embodiments, the faces may be arranged radially around a center point such that the combination of faces forms a prismatic shape. In some embodiments, the vertically oriented edges of each face may abut the vertically oriented edges of each adjacent face to form an enclosed prism.

In some embodiments, the number of faces may depend on the beam steering range 433 of each antenna. For example, where the beam steering range 433 includes a 90-degree range (e.g., a maximum angle of incidence of 45 degrees relative to the normal incidence), the vertical attachment integrated roofing accessory 431d may be configured with four antennas such that where the beam steering range 433 of one antenna ends, the beam steering range 433 of an adjacent antenna begins.

In some embodiments, rather than a prismatic arrangement of faces, the vertical attachment integrated roofing accessory 431d may use triangular or trapezoidal faces that are angled downward to the ground, such that the combination of faces form an upside-down pyramid. Such an arrangement of faces directs the beam steering range 433 of each antenna to cover a larger area of the ground, thus increasing effective coverage of the vertical attachment roofing accessory 431d. The angle of faces may be selected to balance coverage of the ground with coverage of other structures 40 to communicate with other integrated roofing accessories 11. As such, the faces may be oriented such that the beam steering range 433 may include a vertical limit of the range that extends to an angle above a horizontal that projects over a highest integrated roofing accessory 11 within the signal range of the vertical attachment integrated roofing accessory 431d.

In some embodiments, each face of the vertical attachment integrated roofing accessory 431d may include an antennae 313 and/or an SDR 31. In some embodiments, electronics components, e.g., the MEC 32, compute 332 and storage 331, and optionally the SDR 31, as well as other electronics components, may be housed in an electronics compartment (e.g., electronics compartment 20) in a centralized location relative to the faces and shared amongst all the faces. The electronics compartment may extend vertically above the roof 43, enclosed by the faces of the vertical attachment integrated roofing accessory 431d. Thus, processing componentry may be reduced and the vertical attachment integrated roofing accessory 431d may be modularized for any number of antennae but only needing one central computing resource hub.

However, the vertical attachment integrated roofing accessory 431d may also or alternatively be a combination of multiple integrated roofing accessories 11 configured into a single software defined network 30 to share resources amongst each roofing accessory. Such an arrangement results in fewer individual parts and easy plug-and-play construction of vertical attachment integrated roofing accessories 431d, as well as processing and storage redundancy.

Indeed, in some embodiments, the vertical attachment integrated roofing accessory 431d may be formed by arranging multiple siding integrated roofing accessories 431b or coplanar integrated roofing accessories 431a into the prismatic or pyramidal arrangement of faces described above. Similarly, the ridge vent integrated roofing accessory 431c may be two or more coplanar integrated roofing accessories 431a or siding integrated roofing accessories 431b arranged to match the shape of the ridge of the roof. As a result, regardless of which roofing accessory positioning is used, the same integrated roofing accessory 11 parts may be employed, only in different arrangements and positions on the roof 43, reducing a number of models and a number of form factors of integrated roofing accessories 11, and thus reducing manufacturing complexity and cost.

In some embodiments, regardless of the location, each integrated roofing accessory, 431a, 431b, 431c and 431d, may be configured to access resources from the structure 40 via the ridge vent. For example, the roofing accessories may include wiring or cabling to connect to mains power, roof mounted solar power, in-structure networking, a hardwire backhaul network (e.g., fiber optic cabling), among other resources routed through the structure 40 via the ridge vent.

Figure 5:
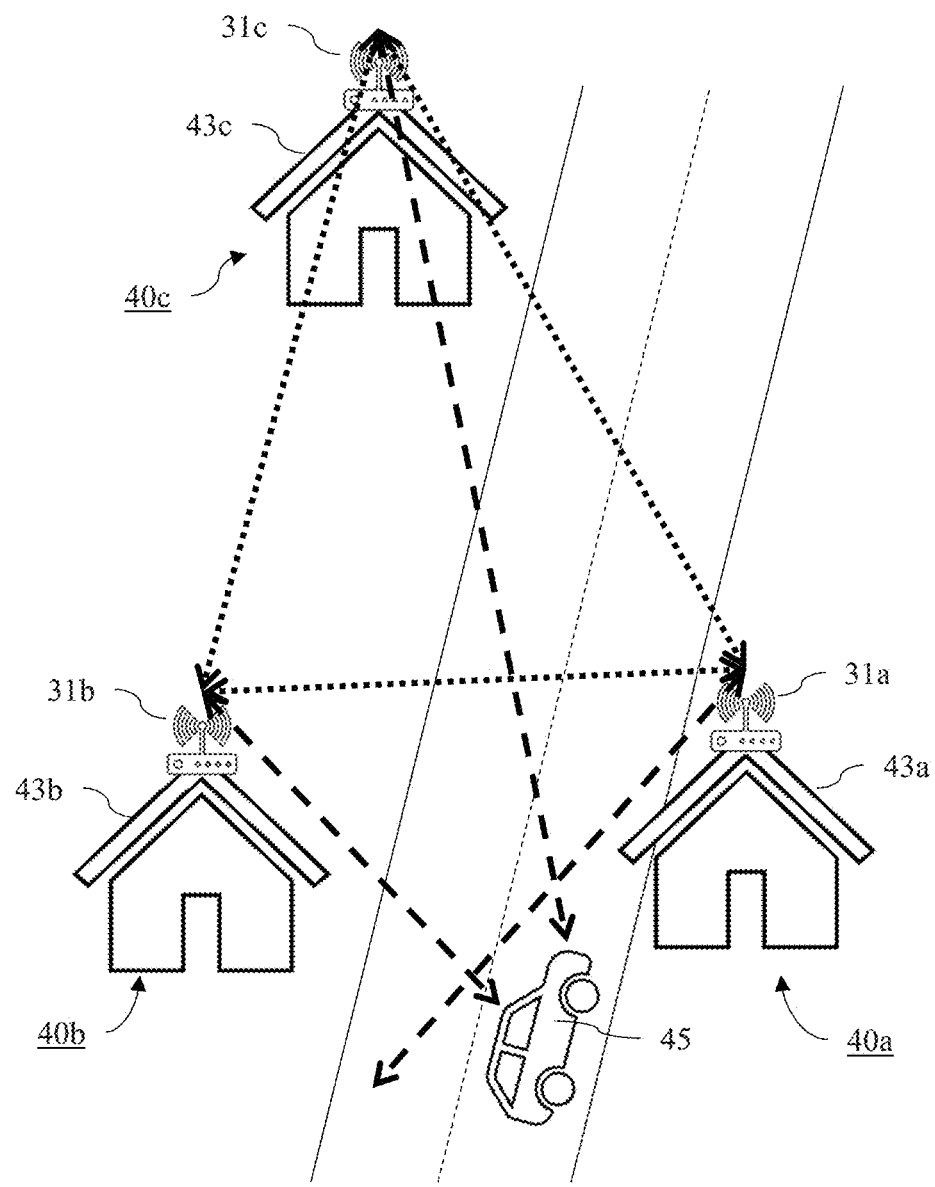
FIG. 5 depicts a non-limiting embodiment depicting integrated roofing accessories of FIG. 1 embedded into various roof locations.

FIG. 5 illustrates an example 5G mesh network using integrated roofing accessories installed on roofs of residential homes according to aspects of embodiments of the present description.

In some embodiments, because 5G signals are directional (see, beamforming described above), antenna placement in an area can affect 5G signal stability and strength because 5G signals may be dependent upon the clearest line of sight for the best possible communication. As such, roof placement for structure-to-structure and the placement on the structure may affect the integrity and strength of the signal.

In some embodiments, each home 40a, 40b and 40c is fitted with a 5G-enabled integrated roofing accessory 31a, 31b, and 31c, respectively. The integrated roofing accessories 31a, 31b, and 31c may provide at least two forms of communication: mesh networking with information sharing by signals between each integrated roofing accessory 31a, 31b, and 31c (denoted with dotted lines); and computing device communication providing 5G signals to a computing device, such as the 5G-enabled vehicle 45 (denoted with dashed lines).

In order to deliver reliable connectivity to a user in the presence of obstacles, a mmWave access point network may be built with redundancies of antennae 31a through 31c. There may be enough redundancy such that, in the event of LOS blocking, the network connection of the 5G-enabled device can be rapidly rerouted via another (e.g., from antenna 31a to antenna 31b or 31c). In such a mmWave access point network, or mesh network, a cluster of access points (e.g., integrated roofing accessories 31a, 31b, and 31c) may be coordinated to provide uninterrupted connectivity to the 5G-enabled device. By using such a cluster of access points, the network may overcome radio-link blockages due to obstacles.

In some embodiments, mesh networking, or the inter-home communication, supports network administration, maintenance and backhaul communication to the carrier. In some embodiments, each structure or home 40a, 40b and 40c may maintain communication with as many structures as possible in the event a structure goes away or there is a better path back to the carrier. Thus, in some embodiments, data transmission from a computing device back to a backhaul infrastructure may be dynamically managed within the network of 5G-enabled integrated roofing accessories 31a, 31b, and 31c. For example, a primary data connect for the vehicle 45 may be provided by home 40b because the integrated roofing accessories 31b and 31c with line-of-sight (LOS) to the vehicle 45 may communicate with each other to determine that integrated roofing accessory 31b has a stronger connection, and thus greater signal strength and signal integrated, resulting in greater speeds, greater stability, and decreased error rates and drop-outs.

As described above, each 5G-enabled device (e.g., vehicle 45, a smartphone, a computer, a WiFi hotspot, among other 5G-enabled devices) in a mmWave network may be served by a cluster of integrated roofing accessories 31a, 31b, and 31c. In some embodiments, the integrated roofing accessories 31a, 31b, and 31c may be selected to be members of the cluster set of a computing device based on which integrated roofing accessories 31a, 31b, and 31c are accessible by the device.

In some embodiments, each integrated roofing accessory 31a, 31b, and 31c may be considered to be accessible if the device can receive a beacon waveform via the integrated roofing accessory 31a, 31b, and 31c. For example, in some embodiments, the mmWave capable integrated roofing accessories 11 may be installed on top of buildings, such as each residential home 40a, 40b and 40c. As a result of the shadowing loss characteristics within the mmWave band, the radio link between a computing device, such as a 5G-enabled vehicle 45, and serving access point, antenna 31b and/or antenna 31c, will likely be disrupted if the line-of-sight (LOS) between the vehicle 45 and the access point is blocked by obstacles. For example, where the vehicle 45 passes close to another building with another antenna 31a, the LOS may be broken by the roof 43a, or the antenna 31a may not have the angular range to direct a beamformed signal to the location of the vehicle 45. Similarly, when a pedestrian (with a 5G-enabled device) walks along a sidewalk, the pedestrian's LOS may be blocked by fixed obstacles (such as trees), or may be blocked by moving obstacles (such as large trucks), or may be blocked by other pedestrians. In a campus courtyard or a tourist hotspot, LOS blocking may be caused by crowds. Other types of LOS blocking may be caused by user motions, such as by hand or body rotations.

In some embodiments, among the integrated roofing accessories 31a, 31b, and 31c, one particular integrated roofing accessory (e.g., integrated roofing accessory 31b) can be selected as the serving integrated roofing accessory 31b for the device, e.g., the vehicle 45 to prevent or minimize the blocking and other disruptions. In some embodiments, the vehicle 45 may select the serving integrate roofing accessory, and/or integrated roofing accessories 31a, 31b or 31c in the mesh network may cooperatively identify the serving roofing accessory based on the strength and stability of test signals using, e.g., a beacon waveform. For example, to select the integrated roofing accessory to serve the vehicle 45 or other device, the beacon waveform may be a broadcast beacon or a swept beam beacon, whose reception has a signal-to-noise-ratio (SNR) threshold above a certain threshold or above the beacon waveform of each other integrate roofing accessory 31a, 31b and 31c. Accessibility information of an integrated roofing accessory 31a, 31b, and 31c by a device may indicate the best, e.g., transmit and receive beam weights, the antenna polarization (e.g. horizontal, vertical or circular) and the corresponding signal strengths. The transmit and receive antenna weights having the greatest signal strength and stability may determine the antenna directivity for a multi-element antenna array. The antenna weights can be implemented using either an analog, digital or hybrid implementation. Other implementations of directional antennas could also be supported by this description. For example, a dielectric lens antenna can focus mmWave energy through diffraction similar to how an optical lens focuses light. The antenna directivity of a dielectric lens antenna is controlled by configuring the switching feed elements.

In some embodiments, the beam synchronization may be maintained, e.g., by selecting the best beams for downlink (DL) and uplink (UL) communication with each of the integrated roofing accessories 31a, 31b, and 31c as the vehicle 45 moves physically through the network. Based on signal characteristics, e.g., detected by the integrated roofing accessories 31a, 31b and 31c or the vehicle 45, or both, the servicing integrate roofing accessory may be maintained or changed as shadowing, blockage and distance to the vehicle 45 changes. For example, the serving roofing accessory may be tested for strength and integrity of signal each, e.g., 1 millisecond (ms), 10 ms, 100 ms, 250 ms, 500 ms, 1 second, 5 seconds, 10 seconds, or other testing frequency.

In some embodiments, the maximize the area covered by signals from the integrated roofing accessories 31a, 31b and 31c, the integrated roofing accessories 31a, 31b and 31c may be installed onto the respective roofs 43a, 43b, and 43c in an optimum roofing configuration, such as the configurations described above with reference to FIG. 5. In some embodiments, the vertical configuration 431d may provide the greatest angular coverage.

In some embodiments, the mesh network may support backhaul by, e.g., forcing Border Gateway Protocol (BGP). BGP can support fast route switching of large networks. In addition, BGP may function as a routing bridge between 5G wireless, 4G/LTE/5G(lite) and wired networks. However, other suitable routing protocols may be employed instead or in addition.

Figure 6:
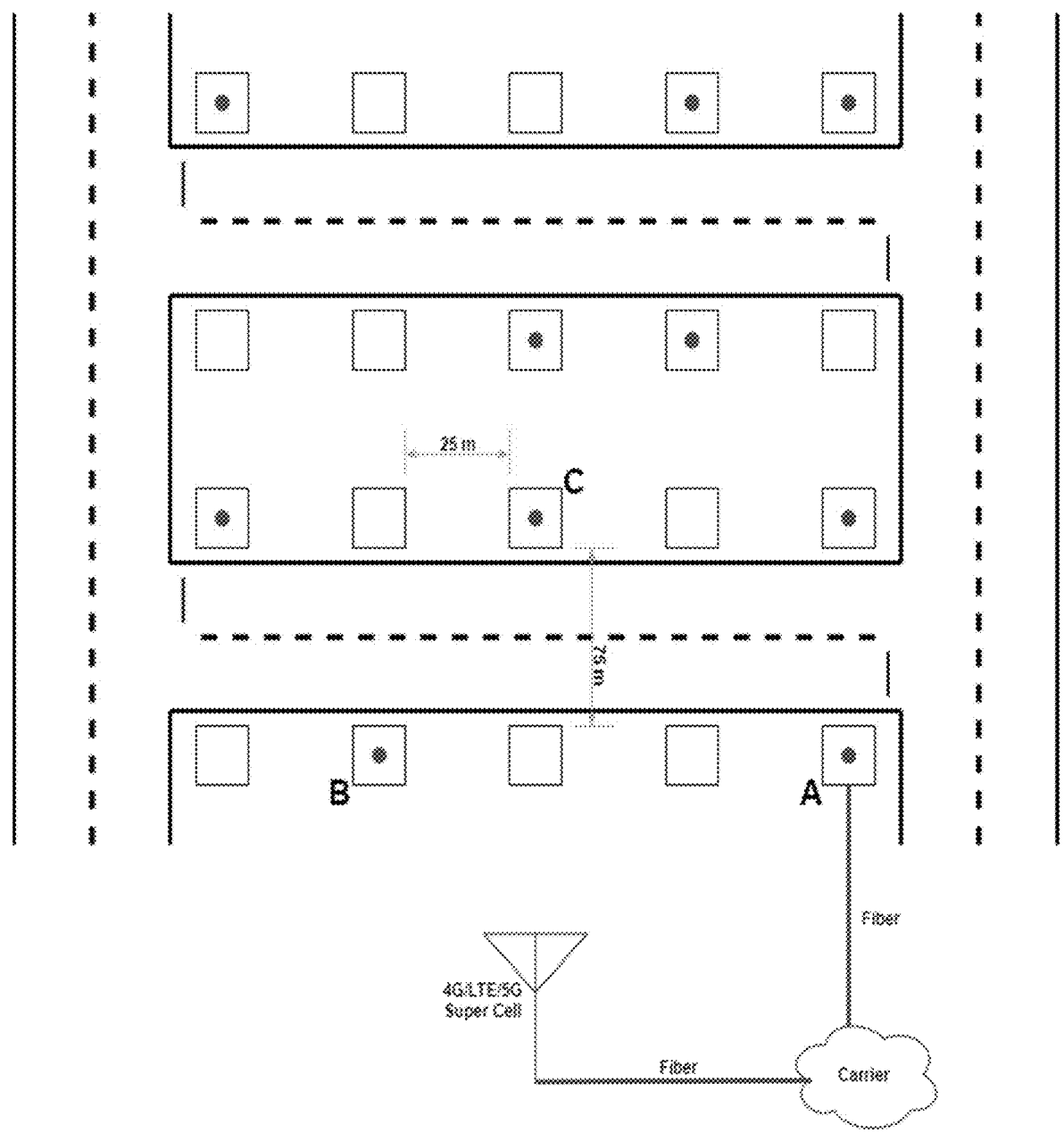
FIG. 6 depicts a non-limiting embodiment depicting an arrangement of the integrated roofing accessories of FIG. 1 across an area for 5G mesh coverage over the whole area.

FIG. 6 depicts a diagram illustrative of embodiments of the present description including a residential neighborhood. Based upon statistics and sampling, roofing material is installed on one of three homes in the United States. The distribution may likely be more or less than 1 of 3. Generally, when roofing tracks are installed a contractor will choose a brand of roofing accessories for the roofing for most properties.

The circles on the homes represent the structures with the integrated roofing accessory 11. At the bottom of the diagram there are two sources of internet access for a 5G Roofing accessory network: Structure-A which is directly connected to fiber back to the carrier and the other, a super cell that connects to Structures A and B via wireless backhaul.

For Structure-A, the primary backhaul and internet access may be provided by the directly connected fiber. Secondary backhaul and internet access will be provided by the wireless supercell. The tertiary network access for Structure-A will come from Structure-B which is wireless connected to the supercell.

Structures-A, B, and C and the other structures with circles represent and participate in the 5G Roofing accessory Mesh network. Each blue dot/structure will have multiple dynamic paths/connection to the carrier network and services, plus the internet.

At least some aspects of the present disclosure will now be described with reference to the following numbered clauses.

Clause 1. A system comprising:
at least one first integrated roofing accessory installed on a first roof, wherein the at least one first integrated roofing accessory comprises:
  i) at least one first transceiver configured to produce millimeter wave (mmWave) frequency signals using at least one fifth generation cellular networking (5G) protocol,
  ii) at least one first dielectric antenna in electrical communication with the at least one first transceiver for emitting the mmWave frequency signals according to the at least one 5G protocol,
iii) a first edge computing device having at least one first processor and at least one first non-transitory storage with first software to operate the first edge computing device in communication with the at least one first transceiver, and
iv) at least one first power supply;
at least one second integrated roofing accessory installed on a second roof, wherein the at least one second integrated roofing accessory comprises:
i) at least one second transceiver configured to produce the mmWave frequency signals using the at least one 5G protocol,
ii) at least one second dielectric antenna in electrical communication with the at least one second transceiver for emitting the mmWave frequency signals according to the at least one 5G protocol,
iii) a second edge computing device having at least one second processor and at least one second non-transitory storage with second software to operate the second edge computing device in communication with the at least one second transceiver, and
iv) at least one second power supply;
at least one third integrated roofing accessory installed on a third roof, wherein the at least one third integrated roofing accessory comprises:
i) at least one third transceiver configured to produce the mmWave frequency signals using the at least one 5G protocol,
ii) at least one third dielectric antenna in electrical communication with the at least one third transceiver for emitting the mmWave frequency signals according to the at least one 5G protocol,
iii) a third edge computing device having at least one third processor and at least one third non-transitory storage with third software configured to operate the third edge computing device in communication with the at least one third transceiver, and
iv) at least one third power supply;
wherein the first software, the second software and the third software are configured to cause, when executed, the at least one first integrated roofing accessory, the at least one second integrated roofing accessory and third the plurality of integrated roofing accessories to form a 5G network using the mmWave frequency signals; and
wherein at least one of the first software, the second software, and the third software are further configured to cause, when executed, the 5G network to communicate with at least one computing device.

Clause 2. A method comprising:
controlling, by at least one first processor of at least one edge computing device of at least one first integrated roofing accessory, at least one first transceiver to produce millimeter wave (mmWave) frequency signals using at least one fifth generation cellular networking (5G) protocol;
wherein the at least one first integrated roofing accessory is installed on a first roof, controlling, the at least one first transceiver, at least one first dielectric antenna to emit the mmWave frequency signals according to the at least one 5G protocol;
controlling, by at least one second processor of at least one edge computing device of at least one second integrated roofing accessory, at least one second transceiver to produce the mmWave frequency signals using the at least one 5G protocol;
wherein the at least one second integrated roofing accessory is installed on a second roof,
controlling, the at least one second transceiver, at least one second dielectric antenna to emit the mmWave frequency signals according to the at least one 5G protocol;
controlling, by at least one third processor of at least one edge computing device of at least one third integrated roofing accessory, at least one third transceiver to produce the mmWave frequency signals using the at least one 5G protocol;
wherein the at least one third integrated roofing accessory is installed on a third roof,
controlling, the at least one third transceiver, at least one third dielectric antenna to emit the mmWave frequency signals according to the at least one 5G protocol;
producing, by the at least one first processor, the at least one second processor and the at least one third processor, a 5G network using the mmWave frequency signals; and
causing the network to communicate, by the at least one first processor, the at least one second processor and the at least one third processor, with at least one computing device.

Clause 3. A method comprising:
obtaining at least one first integrated roofing accessory, comprising:
i) at least one first transceiver configured to produce millimeter wave (mmWave) frequency signals using at least one fifth generation cellular networking (5G) protocol,
ii) at least one first dielectric antenna in electrical communication with the at least one first transceiver for emitting the mmWave frequency signals according to the at least one 5G protocol, and
iii) a first edge computing device having at least one first processor and at least one first non-transitory storage with software;
mounting the at least one first integrated roofing accessory on a first roof,
obtaining at least one second integrated roofing accessory, comprising:
i) at least one second transceiver configured to produce the mmWave frequency signals using the at least one 5G protocol,
ii) at least one second dielectric antenna in electrical communication with the at least one second transceiver for emitting the mmWave frequency signals according to the at least one 5G protocol, and
iii) a second edge computing device having at least one second processor and at least one second non-transitory storage with software;
mounting the at least one second integrated roofing accessory on a second roof,
obtaining at least one third integrated roofing accessory, comprising:
i) at least one third transceiver configured to produce the mmWave frequency signals using the at least one 5G protocol,
ii) at least one third dielectric antenna in electrical communication with the at least one third transceiver for emitting the mmWave frequency signals according to the at least one 5G protocol, and
iii) a third edge computing device having at least one third processor and at least one third non-transitory storage with software;

mounting the at least one third integrated roofing accessory on a third roof, wherein the first software, the second software and the third software are configured to cause, when executed, the at least one first integrated roofing accessory, the at least one second integrated roofing accessory and third the plurality of integrated roofing accessories to form a 5G network using the mmWave frequency signals; and wherein at least one of the first software, the second software, and the third software are further configured to cause, when executed, the 5G network to communicate with at least one computing device.

Clause 4. The systems and methods of clauses 1 through 3, wherein at least one of the at least one first integrated roofing accessory, the at least one second integrated roofing accessory, or the at least one third integrated roofing accessory is integrated into at least one modified photovoltaic module.

Clause 5. The systems and methods of clause 4, wherein the at least one modified photovoltaic module comprises at least one photovoltaic panel.

Clause 6. The systems and methods of clauses 1 through 3, wherein at least one of the at least one first transceiver, the at least one second transceiver, or the at least one third transceiver comprises a software-defined radio module.

Clause 7. The systems and methods of clause 6, wherein the software-defined radio module comprises a virtual firewall.

Clause 8. The systems and methods of clauses 1 through 3, wherein the 5G network is defined according to an Open Systems Interconnection (OSI) model.

Clause 9. The systems and methods of clauses 1 through 3, wherein the at least one first integrated roofing accessory further comprises:
  a compartment, holding:
    i) the at least one first transceiver,
    ii) the at least one first dielectric antenna, and
    iii) the at least one first edge computing device;
  wherein a portion of the compartment comprises a roofing material; and a frame connected to the compartment and to the first roof.

Clause 10. The systems and methods of clause 9, wherein the compartment extends vertically above the first roof.

Clause 11. The systems and methods of clause 9, wherein the frame is installed into a ridge vent of the first roof.

Clause 12. The systems and methods of clauses 1 through 3, wherein the at least one first integrated roofing accessory further comprises:
  a shingle, holding:
    i) the at least one first transceiver,
    ii) the at least one first dielectric antenna, and
    iii) the at least one first edge computing device.

Clause 13. The systems and methods of clauses 1 through 3, wherein the at least one first dielectric antenna is a plurality of first dielectric antennas.

Clause 14. The systems and methods of clauses 1 through 3, wherein the at least one first integrated roofing accessory further comprises:
  a siding, holding:
    i) the at least one first transceiver,
    ii) the at least one first dielectric antenna, and
    iii) the at least one first edge computing device.

Clause 15. The systems and methods of clauses 1 through 3, wherein at least one of the first software, the second software, or the third software are further configured to cause, when executed, the 5G network to communicate with at least one customer access radio enabled computing device.

Clause 16. The systems and methods of clause 15, wherein the customer access radio enabled device comprises a WiFi communication module.

Clause 17. The systems and methods of clauses 1 through 3:
  wherein the at least one first integrated roofing accessory comprise a first data storage device and a first compute device;
  wherein the at least one second integrated roofing accessory comprise a second data storage device and a second compute device;
  wherein the at least one third integrated roofing accessory comprise a third data storage device and a third compute device; and
  wherein the first software, the second software and the third software are configured to cause, when executed, the at least one first integrated roofing accessory, the at least one second integrated roofing accessory and third the plurality of integrated roofing accessories to form a distributed datacenter across the 5G network.

Clause 18. The systems and methods of clauses 1 through 3, further comprising a fiber optic connection between a backhaul network and at least one of the at least one first integrated roofing accessory, the at least one second integrated roofing accessory, or the at least one third integrated roofing accessory.

Clause 19. The systems and methods of clauses 1 through 3, wherein the 5G network is a mesh network.

Clause 20. The systems and methods of clauses 1 through 3, further comprising an array of photovoltaic panels; and
  wherein at least one of the at least one first integrated roofing accessory, the at least one second integrated roofing accessory, or the at least one third integrated roofing accessory is powered by the array of photovoltaic panels.

Clause 21. The systems and methods of clauses 1 through 3, further comprising a mains power connection via a ridge vent; and
  wherein at least one of the at least one first integrated roofing accessory, the at least one second integrated roofing accessory, or the at least one third integrated roofing accessory is powered by the mains power connection.

At least some aspects of the present disclosure will now be described with reference to the following additional numbered clauses.

Clause 1. A system comprising:
  a first plurality of integrated roofing accessories installed on a first roof, wherein the first plurality of integrated roofing accessories comprise:
    i) at least one first transceiver configured to produce millimeter wave (mmWave) frequency signals using at least one fifth generation cellular networking (5G) protocol,
    ii) at least one first dielectric antenna in electrical communication with the at least one first transceiver for emitting the mmWave frequency signals according to the at least one 5G protocol,
    iii) a first edge computing device having at least one first processor and at least one first non-transitory storage with first software to operate the first edge computing device in communication with the at least one first transceiver, and
    iv) at least one first power supply;

a second plurality of integrated roofing accessories installed on a second roof, wherein the second plurality of integrated roofing accessories comprise:
   i) at least one second transceiver configured to produce the mmWave frequency signals using the at least one 5G protocol,
   ii) at least one second dielectric antenna in electrical communication with the at least one second transceiver for emitting the mmWave frequency signals according to the at least one 5G protocol,
   iii) a second edge computing device having at least one second processor and at least one second non-transitory storage with second software to operate the second edge computing device in communication with the at least one second transceiver, and
   iv) at least one second power supply;
a third plurality of integrated roofing accessories installed on a third roof, wherein the third plurality of integrated roofing accessories comprise:
   i) at least one third transceiver configured to produce the mmWave frequency signals using the at least one 5G protocol,
   ii) at least one third dielectric antenna in electrical communication with the at least one third transceiver for emitting the mmWave frequency signals according to the at least one 5G protocol,
   iii) a third edge computing device having at least one third processor and at least one third non-transitory storage with third software configured to operate the third edge computing device in communication with the at least one third transceiver, and
   iv) at least one third power supply;
wherein the first software, the second software and the third software are configured to cause, when executed, the first plurality of integrated roofing accessories, the second plurality of integrated roofing accessories and third the plurality of integrated roofing accessories to form a computer network using the mmWave frequency signals; and
wherein at least one of the first software, the second software, and the third software are further configured to cause, when executed, the computer network to communicate with at least one computing device.

Clause 2. A method comprising:
controlling, by at least one first processor of at least one edge computing device of at least one first plurality of integrated roofing accessories, at least one first transceiver to produce millimeter wave (mmWave) frequency signals using at least one fifth generation cellular networking (5G) protocol;
   wherein the first plurality of integrated roofing accessories are installed on a first roof,
controlling, the at least one first transceiver, at least one first dielectric antenna to emit the mmWave frequency signals according to the at least one 5G protocol;
controlling, by at least one second processor of at least one edge computing device of at least one second plurality of integrated roofing accessories, at least one second transceiver to produce the mmWave frequency signals using the at least one 5G protocol;
   wherein the second plurality of integrated roofing accessories are installed on a second roof,
controlling, the at least one second transceiver, at least one second dielectric antenna to emit the mmWave frequency signals according to the at least one 5G protocol;

controlling, by at least one third processor of at least one edge computing device of at least one third plurality of integrated roofing accessories, at least one third transceiver to produce the mmWave frequency signals using the at least one 5G protocol;
   wherein the third plurality of integrated roofing accessories are installed on a third roof,
controlling, the at least one third transceiver, at least one third dielectric antenna to emit the mmWave frequency signals according to the at least one 5G protocol;
producing, by the at least one first processor, the at least one second processor and the at least one third processor, a computer network using the mmWave frequency signals; and
causing the network to communicate, by the at least one first processor, the at least one second processor and the at least one third processor, with at least one computing device.

Clause 3. A method comprising:
obtaining a first plurality of integrated roofing accessories, comprising:
   i) at least one first transceiver configured to produce millimeter wave (mmWave) frequency signals using at least one fifth generation cellular networking (5G) protocol,
   ii) at least one first dielectric antenna in electrical communication with the at least one first transceiver for emitting the mmWave frequency signals according to the at least one 5G protocol, and
   iii) a first edge computing device having at least one first processor and at least one first non-transitory storage with software;
mounting the first plurality of integrated roofing accessories on a first roof,
obtaining a second plurality of integrated roofing accessories, comprising:
   i) at least one second transceiver configured to produce the mmWave frequency signals using the at least one 5G protocol,
   ii) at least one second dielectric antenna in electrical communication with the at least one second transceiver for emitting the mmWave frequency signals according to the at least one 5G protocol, and
   iii) a second edge computing device having at least one second processor and at least one second non-transitory storage with software;
mounting the second plurality of integrated roofing accessories on a second roof,
obtaining a third plurality of integrated roofing accessories, comprising:
   i) at least one third transceiver configured to produce the mmWave frequency signals using the at least one 5G protocol,
   ii) at least one third dielectric antenna in electrical communication with the at least one third transceiver for emitting the mmWave frequency signals according to the at least one 5G protocol, and
   iii) a third edge computing device having at least one third processor and at least one third non-transitory storage with software;
mounting the third plurality of integrated roofing accessories on a third roof,
wherein the first software, the second software and the third software are configured to cause, when executed, the first plurality of integrated roofing accessories, the second plurality of integrated roofing accessories and third the plurality of integrated roofing accessories to form a computer network using the mmWave frequency signals; and wherein at least one of the first software, the second software, and the third software are further configured to cause, when executed, the computer network to communicate with at least one computing device.

Clause 4. The systems and methods of clauses 1 through 3, wherein at least one of the first plurality of integrated roofing accessories, the second plurality of integrated roofing accessories, or the third plurality of integrated roofing accessories is integrated into at least one modified photovoltaic module.

Clause 5. The systems and methods of clause 4, wherein the at least one modified photovoltaic module comprises at least one photovoltaic panel.

Clause 6. The systems and methods of clauses 1 through 3, wherein at least one of the at least one first transceiver, the at least one second transceiver, or the at least one third transceiver comprises a software-defined radio module.

Clause 7. The systems and methods of clause 6, wherein the software-defined radio module comprises a virtual firewall.

Clause 8. The systems and methods of clauses 1 through 3, wherein the computer network is defined according to an Open Systems Interconnection (OSI) model.

Clause 9. The systems and methods of clauses 1 through 3, wherein the first plurality of integrated roofing accessories further comprises:
  a compartment, holding:
    i) the at least one first transceiver,
    ii) the at least one first dielectric antenna, and
    iii) the at least one first edge computing device;
  wherein a portion of the compartment comprises a roofing material; and a frame connected to the compartment and to the first roof.

Clause 10. The systems and methods of clause 9, wherein the compartment extends vertically above the first roof.

Clause 11. The systems and methods of clause 9, wherein the frame is installed into a ridge vent of the first roof.

Clause 12. The systems and methods of clauses 1 through 3, wherein at least one integrated roofing accessory of the first plurality of integrated roofing accessories further comprises:
  a shingle, holding:
    i) the at least one first transceiver,
    ii) the at least one first dielectric antenna, and
    iii) the at least one first edge computing device.

Clause 13. The systems and methods of clauses 1 through 3, wherein the at least one first dielectric antenna is a plurality of first dielectric antennas.

Clause 14. The systems and methods of clauses 1 through 3, wherein at least one integrated roofing accessory of the first plurality of integrated roofing accessories further comprises:
  a siding, holding:
    i) the at least one first transceiver,
    ii) the at least one first dielectric antenna, and
    iii) the at least one first edge computing device.

Clause 15. The systems and methods of clauses 1 through 3, wherein at least one of the first software, the second software, or the third software are further configured to cause, when executed, the computer network to communicate with at least one customer access radio enabled computing device.

Clause 16. The systems and methods of clause 15, wherein the customer access radio enabled device comprises a WiFi communication module.

Clause 17. The systems and methods of clauses 1 through 3:
  wherein the first plurality of integrated roofing accessories comprise a first data storage device and a first compute device;
  wherein the second plurality of integrated roofing accessories comprise a second data storage device and a second compute device;
  wherein the third plurality of integrated roofing accessories comprise a third data storage device and a third compute device; and
  wherein the first software, the second software and the third software are configured to cause, when executed, the first plurality of integrated roofing accessories, the second plurality of integrated roofing accessories and third the plurality of integrated roofing accessories to form a distributed datacenter across the computer network.

Clause 18. The systems and methods of clauses 1 through 3, further comprising a fiber optic connection between a backhaul network and at least one of the first plurality of integrated roofing accessories, the second plurality of integrated roofing accessories, or the third plurality of integrated roofing accessories.

Clause 19. The systems and methods of clauses 1 through 3, wherein the computer network is a mesh network.

Clause 20. The systems and methods of clauses 1 through 3, further comprising an array of photovoltaic panels; and
  wherein at least one of the first plurality of integrated roofing accessories, the second plurality of integrated roofing accessories, or the third plurality of integrated roofing accessories is powered by the array of photovoltaic panels.

Clause 21. The systems and methods of clauses 1 through 3, further comprising a mains power connection via a ridge vent; and
  wherein at least one of the first plurality of integrated roofing accessories, the second plurality of integrated roofing accessories, or the third plurality of integrated roofing accessories is powered by the mains power connection.

Referring to FIGS. 7A and 7B and FIGS. 8A and 8B, mounting arrangements are depicted for securing at least one communication component (e.g., at least one 5G component (e.g., antenna)) to or within an integrated roofing accessory 11 and/or the integrated roofing accessory 11 to the roof 43 using direct or indirect attachment with an adjustable attachment 46.

In some embodiments, because 5G signals are directional (see, beamforming described above), antenna 313 placement in an area can affect 5G signal stability and strength because 5G signals may be dependent upon the clearest line of sight for the best possible communication. As described above, the 5G signals may be restricted to which the conical FOV of an antenna 313. Stationary placement affords limited beam steering to improve, compensate for, or other address signal performance affecting conditions.

In some embodiments, the signal performance affecting conditions can include, e.g., a physical environment, such as roof features (e.g., size, shape, height, slope, etc.), trees and other vegetation, surround buildings, houses and other structures, and any other features of the physical environment obstructing signaling, weather conditions including precipitation (e.g., rain, snow, sleet, hail, etc.), fog, smog, smoke, etc., physical damage such as where the integrated roofing accessory 11 and/or the antenna 313 is struck by an object (e.g., fallen branch or tree, sleet or hail, birds and other wildlife, etc.), software errors in the integrated roofing accessory 11, among other conditions, events, objects, and settings that may affect the performance of communication components (such as 5G components) that are associated with the integrated roofing accessory 11.

Thus, in some embodiments, the exemplary communication component (e.g., 5G component (e.g., antenna)) may be removably secured within or to the integrated roofing accessory 11, utilizing, for example, without limitation, an adjustable attachment 46. In some embodiments, the adjustable attachment 46 may include, e.g., a hinge, a geared connection, a motorized attachment, or any other suitable mechanical arrangement on which, for example, may be secured within or to the integrated roofing accessory 11 for manual and/or automatic repositioning and/or reorienting to improve the performance of the antenna 313 (e.g., a 5G antenna or other suitable antenna), by for example, without limitation, improving beam steering range via physical steering and thereby overcome an obstructed or insufficient FOV. The physical steering may be employed to augment the beam steering itself in order to better address signal performance affecting conditions. In some embodiments, the adjustable attachment 46 may physically steer the antenna 313 independent from the integrated roofing accessory 11 over physical steering range of, e.g., 10 degrees, 20 degrees, 30 degrees, 45 degrees, 60 degrees, 70 degrees, 75 degrees, 80 degrees, 90 degrees, 180 degrees, 360 degrees, or multiples thereof. In some embodiments, the adjustable attachment 46 may physically steer the antenna 313 around a vertical axis, around a horizontal axis, around an axis slanted to be between horizontal and vertical, or any combination thereof.

In some embodiments, t the antenna 313 may be removably secured to or within the integrated roofing accessory 11 so that the antenna 313, the electronics components 21 (e.g., 5G-infrastructure supporting electronics components ("5G electronics components") and/or any other suitable electronics components) or any other communication component, may be replaced without removal of the integrated roofing accessory 11 from the roof. For example, if the adjustable attachment 46 is utilized to secure the antenna 313, or the electronics components 21 or any other communication component, to the integrated roofing accessory 11, an exemplary securing mechanism can be non-permanent (e.g., removable mount) so that a malfunctioning communication component (e.g., malfunctioning antenna 313, a malfunction electronics component of the electronics components 21) can be removed and replaced by a new working communication component (e.g., new working antenna 313). For example, signal performance affecting conditions may cause an operational error and/or physical damage to result in the malfunctioning communication component (e.g., malfunctioning antenna 313).

In some embodiments, the adjustable attachment 46 may include a body 461 that may be removably or permanently attached to the integrated roofing accessory 11 to facilitate securing of at least one communication component (e.g., antenna 313, electronics components 21, or any combination of the antenna 313, the electronics components and subcomponents thereof) to the integrated roofing accessory 11, positioned on the roof 43. In some embodiments, the body 461 may be directly attached, e.g., via one or more mechanical fastener(s) (e.g., screws, nails, pins, rivets, clamps, and the like), adhesives, and other forms of attachment and any combination thereof.

In some embodiments, the body 461 of the adjustable attachment 46 may serve to mount to or otherwise position the integrated roofing accessory 11 and/or one or more electronics components 21 thereof on the roof 43. In some embodiments, the body 461 may also include a channel or cavity extending therethrough to align with an opening in the roof 43. Accordingly, in some embodiments, electrically wiring from the electronics components 21 and/or the antenna 313 may be routed through the body 461 of the adjustable attachment 46 and into the structure associated with the roof 43. As a result, the integrated roofing accessory 11 may be connected to components within the structure via electrical wiring, such as, e.g., the customer access radio 35 (e.g., a WiFi radio, a router (wired or wireless), a firewall, computer storage and/or memory, consumer electronics such as computers, televisions, and other smart home appliances, etc.). Routing wiring through the body 461 of the adjustable attachment 46 may facilitate maintaining a waterproof integrity of the roof 43 while enabling wired connections between an integrated roofing accessory 11 and components and devices within the structure.

In some embodiments, as illustrated in FIG. 7A, the adjustable attachment 46 may include at least one attachment mechanism 462 to adjustably attach the body 461 to the integrated roofing accessory 11 including the antenna 313, or the electronics components 21, to the roof 43 or to both the integrated roofing accessory 11 the antenna 313, or the electronics components 21 and the roof 43. FIG. 7A, simply for illustration purposes, depicts one attachment mechanism 462 for attaching the adjustable attachment 46 to the integrated roofing accessory 11 the antenna 313, or the electronics components 21. However, the attachment mechanism 462 may be on a side of the body 461 facing the roof 43 for adjustable attachment to the roof 43, or there may be an attachment mechanism 462 on both the side of the body 461 facing the roof 43 and the side of the body 461 facing the integrated roofing accessory 11 the antenna 313, or the electronics components 21. In some embodiments, the attachment mechanism 462 may include any suitable attachment for permanent or removable attachment of the integrated roofing accessory 11, the roof 43 or both the integrated roofing accessory 11 and the roof 43. For example, the attachment mechanism 462 may include, e.g., one or more bracket(s) that mates to a bracket or mount on the antenna 313, or the electronics components 21 and/or the roof 43, one or more mount(s) that mates to a bracket or mount on the antenna 313, or the electronics components 21 and/or the roof 43, one or more latch(s), one or more hinge(s), one or more clamp(s), or any other attachment mechanism or system of attachment mechanisms or any combination thereof.

Figure 7B:
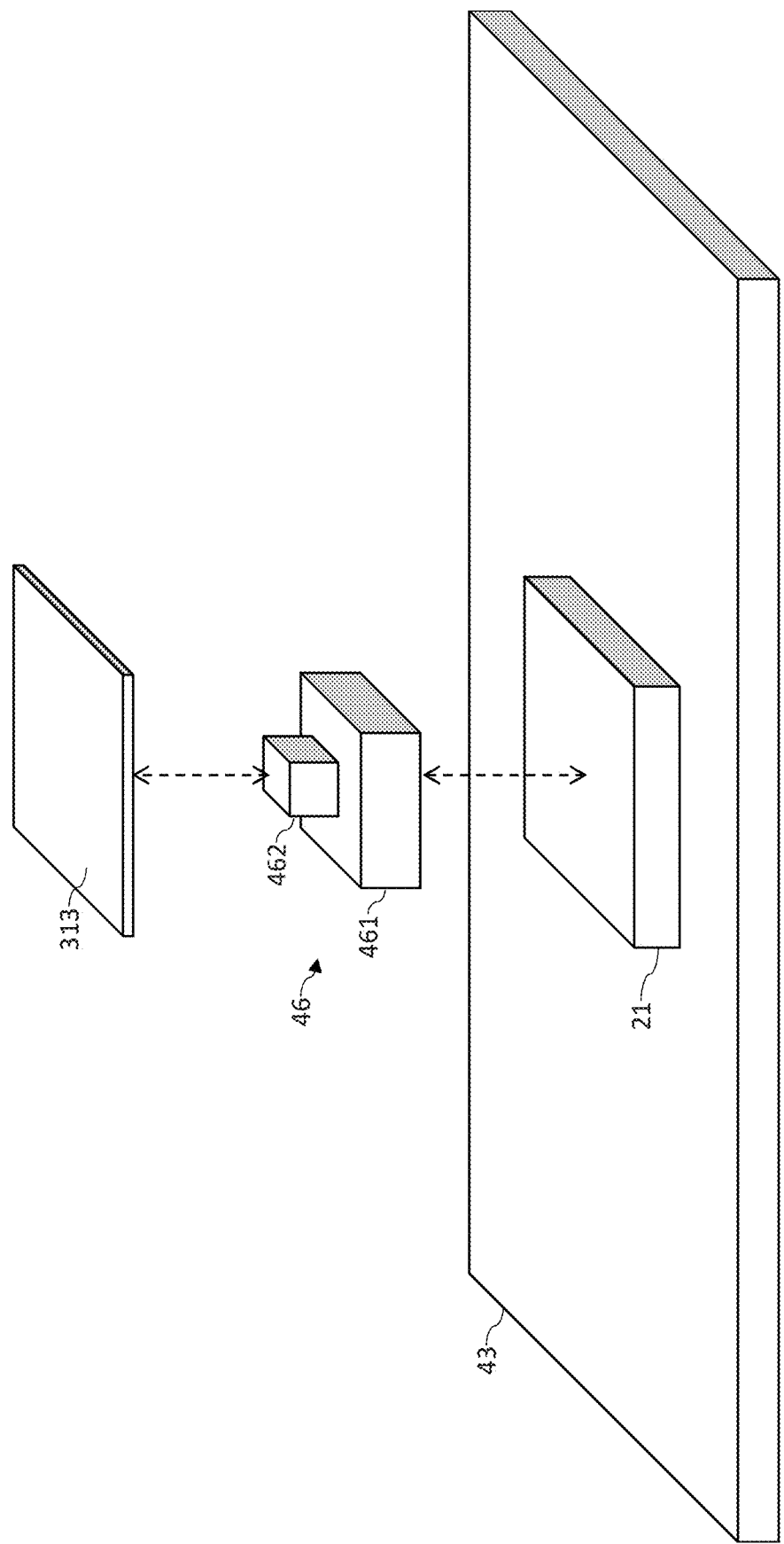

In some embodiments, as illustrated in FIG. 7B, the adjustable attachment 46 may include the at least one attachment mechanism 462 to adjustably attach the body 461 to antenna 313, to the electronics components 21 of the integrated roofing accessory 11, or to both the antenna 313 and the electronics components 21 of the integrated roofing accessory 11. The integrated roofing accessory 11 including the antenna 313 attached to the electronics components 21 via the adjustable attachment 46 may be mounted or otherwise positioned on the roof 43 by, e.g., a direct attachment between the electronics components 21 and the roof 43. FIG. 7B, simply for illustration purposes, depicts one attachment mechanism 462 for attaching the adjustable attachment 46 to the antenna 313. However, the attachment mechanism 462 may be on a side of the body 461 facing the electronics components 21 for adjustable attachment to the electronics components 21, or there may be an attachment mechanism 462 on both the side of the body 461 facing the electronics components 21 and the side of the body 461 facing the antenna 313. In some embodiments, the attachment mechanism 462 may include any suitable attachment for permanent or removable attachment of the electronics components 21, the antenna 313 or both the electronics components 21 and the antenna 313. For example, the attachment mechanism 462 may include, e.g., one or more bracket(s) that mates to a bracket or mount on the electronics components 21 and/or the antenna 313, one or more mount(s) that mates to a bracket or mount on the electronics components 21 and/or the antenna 313, one or more latch(es), one or more hinge(s), one or more clamp(s), or any other attachment mechanism or system of attachment mechanisms or any combination thereof.

In some embodiments, the body 461 may include a suitable adjustment mechanism to re-tilt, re-angle or re-orient the antenna 313. The adjustment mechanism may include any manually or computer controlled device for adjusting a tilt, angle or orientation of the integrated roofing accessory 11 as a whole, and/or the antenna 313 individually relative to the roof 43. By adjusting the tilt, angle or orientation of the integrated roofing accessory 11 as a whole, and/or the antenna 313 individually, the FOV of the antenna 313 may be re-tilted, re-angled or re-oriented to perform the physical steering of the antenna 313 and the FOV of the antenna 313.

For example, in some embodiments, the body 461 may include, e.g., friction fit for a hinge (e.g., a hinge of the attachment mechanism 462) such that the body 461 holds the orientation of the hinge in a particular orientation via friction. Adjustment may then be performed by actuating the tilt of the integrated roofing accessory 11 as a whole, and/or the antenna 313 individually by application of force greater than the friction, or by release the friction fit during adjustment and resetting the friction fit upon the completion of the adjustment.

In another example, in some embodiments, the body 461 may include a gear set including one or more gears that engage with one or more gears of the attachment mechanism 462. The gear set may be driven by, e.g., an attached crank, a removable crank (e.g., via a keyed slot), a dial, by external application of force on the integrated roofing accessory 11 as a whole, and/or the antenna 313 individually to overcome internal friction of an enclosed gear set, or by any other suitable adjustment.

In some embodiments, the body 461 may include, e.g., a powered actuator, such as, e.g., an electrically driven actuator, a hydraulically driven actuator, and the like. In some embodiments, the powered actuator may include one or more linear actuators that raise and lower portions of the integrated roofing accessory 11 as a whole, and/or the antenna 313 individually to adjust tilt to adjust the orientation, and adjust the position by raising and/or lowering the integrated roofing accessory 11 as a whole, and/or the antenna 313 individually. For example, four linear actuators may be employed in a spaced relationship on or within the attachment mechanism 462 or directly connected to the integrated roofing accessory 11 as a whole, and/or the antenna 313 individually. Variations in the length of extension of each linear actuator may effectuate a particular degree of tilt, and thus a particular orientation for physical steering of the FOV of the antenna 313. In some embodiments, the linear actuators may alternatively or additionally be mounted so as to shift the integrated roofing accessory 11 as a whole, and/or the antenna 313 individually from side to side, forward and back, or up and down.

In some embodiments, the powered actuator may include a rotational actuator, e.g., a motor such as an electric motor. The electric motor may be directly attached to a hinge or axle attached to the integrated roofing accessory 11 as a whole, and/or the antenna 313 individually, e.g., directly or via the attachment mechanism 462 to cause a rotation in a direction and cause the tilt. In some embodiments, the rotational actuator may be combined with the gear set as described above.

In some embodiments, the powered actuator may be controlled, as will be described in greater detail below, via processing device, e.g., housed in the body 461 (e.g., the edge computing device 32 or other computing device), connected via a suitable communication interface (e.g., wired or wireless communication interfaces and/or protocols), or a combination thereof. For example, the technician may utilize a computing device external to the adjustable attachment 46 to control the powered actuator via the communication interface either remotely (e.g., via an internet connection) or locally via a local connection (e.g., wired connection, WiFi, Bluetooth, Zigbee, Z-Wave, etc.). In another example, the technician may utilize controls mounted on the body 461 to control the powered actuator.

In some embodiments, the powered actuator may be controlled automatically, as will be described in greater detail below, via processing device, e.g., housed in the body 461 (e.g., the edge computing device 32 or other computing device), connected via a suitable communication interface (e.g., wired or wireless communication interfaces and/or protocols), or a combination thereof. For example, the processing device may include suitable algorithms to automatically adjust tilt and/or position for physical steering to, e.g., optimize orientation, address faults and errors, increase the beam steering range, or other functionality.

In some embodiments, the adjustable attachment 46 may be manually adjusted to physically steer the integrated roofing accessory 11 as a whole, and/or the antenna 313 individually in response to signal performance affecting conditions. For example, during installation of the integrated roofing accessory 11, a technique or other personnel may adjust the adjustable attachment 46 to select an optimum orientation of the antenna 313 FOV by physically steering the integrated roofing accessory 11 as a whole, and/or the antenna 313 individually. Similarly, the technician or other user may adjust the adjustable attachment 46 to address a current orientation of the integrated roofing accessory 11 as a whole, and/or the antenna 313 individually. For example, signal performance affecting conditions may include where the integrated roofing accessory 11 as a whole, and/or the antenna 313 individually is struck by an object (e.g., fallen branch or tree, sleet or hail, birds and other wildlife, etc.), the technician may adjust the adjustable attachment 46 to realign the integrated roofing accessory 11 as a whole, and/or the antenna 313 individually with orientation of optimal performance.

In some embodiments, the integrated roofing accessory 11 may generate and log performance data related to, e.g., signal-to-noise ratios of communications with other 5G-enabled devices, signal strength of communications with other 5G-enabled devices, packet loss or data loss in communications with other 5G-enabled devices, among other performance data. The technician may use the performance data to determine an improved orientation of the integrated roofing accessory 11 as a whole, and/or the antenna 313 individually. In some embodiments, the performance data may be combined with signal performance affecting conditions such as the physical environment, such as roof features (e.g., size, shape, height, slope, etc.), trees and other vegetation, surround buildings, houses and other structures, and any other features of the physical environment. For example, in some embodiments, the technician may connect a computing device having a display to the integrated roofing accessory 11. The integrated roofing accessory 11 may provide to the computing device a continuous stream of the performance data in real-time. The technician may view, on the display, the continuous stream of current performance data in realtime to monitor the effect of adjusting the physical steering and re-orientation of the integrated roofing accessory 11 as a whole, and/or the antenna 313 individually according to changes in the current performance data. The technician may, therefore, discover the optimum orientation for the integrated roofing accessory 11 as a whole, and/or the antenna 313 individually at the location where it is mounted on the roof. In some embodiments, the technician may adjust the physical steering and orientation during installation or anytime thereafter, e.g., in response to an alert of a signal performance affecting condition.

In some embodiments, the optimal orientation may be determined algorithmically, using machine learning techniques, through trial and error, or any combination thereof. In some embodiments, the performance data may include the use of the beacon waveform as described above, whose reception has a SNR threshold above a certain threshold. The performance data may be indicative of a 5G signaling or communication performance of the integrated roofing accessory 11 relative to another 5G-enabled device that may indicate the best, e.g., transmit and receive beam weights, the antenna 313 polarization (e.g. horizontal, vertical or circular) and the corresponding signal strengths. The transmit and receive antenna 313 weights having the greatest signal strength and stability may determine the physical orientation of the integrated roofing accessory 11 as a whole, and/or the antenna 313 individually. In some embodiments, the antenna 313 may be rotated through a scanning range periodically to assess orientations with the greatest performance based at least in part on at least one environmental condition (e.g., physical obstacle, weather conditions, etc.). In some embodiments, during rotation, sample performance data may be collected from the beacon waveform to determine orientations and/or positions having the greatest signal strength and/or stability. In some embodiments, the sample performance data is collected incrementally or iteratively in response to a drop in signal performance during operation. When the signal performance drops, the antenna 313 may be rotated or otherwise repositioned to a next orientation and/or position, and where the sample performance data at the next orientation and/or position is better than the original orientation and/or position, then the next orientation is maintained as a new orientation and/or position. Where there is no improvement to the performance, the antenna 313 may be rotated to a next orientation and/or position and the process repeated, or it may be returned to the original orientation and/or position.

In some embodiments, a power level to the antenna 313 and the resulting performance data may be similarly assessed. The power level may be sampled at various power levels and the resulting performance data collected. In some embodiments, the power level having the greatest performance may be selected for use in communication. In some embodiments, the sample performance data is collected incrementally or iteratively in response to a drop in signal performance during operation. When the signal performance drops, the power level may be adjusted to a next higher power level and/or next lower power level, and where the sample performance data at the next higher power level and/or next lower power level is better than the original power level, then the next higher power level and/or next lower power level is maintained as a new power level.

In some embodiments, the performance of the communication may be assessed with respect to orientation, position or signal strength, or any combination thereof. Thus, antenna 313 characteristics including orientation, position and signal strength may, in any suitable combination, be varied to sample performance data and/or determine improved characteristics for improved signal and/or communication performance.

For example, in some embodiments, a machine learning model may be trained to correlate performance data with the presence and relative location of features of the physical environment. In some embodiments, the integrated roofing accessory 11 may track performance data with respect to physical steering and beam steering of the integrated roofing accessory 11 as a whole, and/or the antenna 313 individually. Whether a physical environment includes a feature within the FOV may be provided as feedback to train the machine learning model to train the machine learning model to predict from the performance data the location and/or presence of a feature of the physical environment. The prediction may be provided to the technician provide an alert of potential performance improvements. For example, the integrated roofing accessory 11 may notify the technician when the FOV of the antenna 313 is misaligned with respect to surroundings (e.g., facing the wrong direction on the roof, oriented towards the roof, another structure or other physical feature, etc.).

In some embodiments, a machine learning model and/or logical algorithm may use the performance data and/or usage data to determine an effectiveness of a current orientation of the integrated roofing accessory 11 as a whole, and/or the antenna 313 individually. For example, where the integrated roofing accessory 11 has less 5G communication traffic than, e.g., nearby integrated roofing accessories, or than the integrated roofing accessory 11 has had in the past, the integrated roofing accessory 11 may benefit from physical steering to reorient the integrated roofing accessory 11 as a whole, and/or the antenna 313 individually.

In some embodiments, the adjustable attachment 46 may operate automatically to in response to the performance data and variation of the performance data through time. In some embodiments, computing devices and/or processors, such as the edge computing device 32, may connected to the adjustable attachment 46 to control the adjustable attachment 46 to physically steer the integrated roofing accessory 11 as a whole, and/or the antenna 313 individually. In some embodiments, as described above, the optimal orientation may be determined algorithmically, using machine learning techniques, or any combination thereof. In some embodiments, the performance data may include the use of the beacon waveform as described above, whose reception has a SNR threshold above a certain threshold. The performance data information of an integrated roofing accessory 11 relative to another 5G-enabled device may indicate the best, e.g., transmit and receive beam weights, the antenna 313 polarization (e.g. horizontal, vertical or circular) and the corresponding signal strengths. The transmit and receive antenna 313 weights having the greatest signal strength and stability may determine the physical orientation of the integrated roofing accessory 11 as a whole, and/or the antenna 313 individually having the greatest performance in communication with another 5G-enabled computing device. Accordingly, in some embodiments, the computing devices and/or processors may automatically adjust the adjustable attachment 46 to achieve the optimal orientation.

In some embodiments, the computing devices and/or processors may combine beam steering with physical steering via control of the adjustable attachment 46. In some embodiments, the computing devices and/or processors may steer the beam within the FOV of the antenna 313. Once the beam has reached the edge of the FOV of the antenna 313, the computing devices and/or processors may automatically control the adjustable attachment 46 to physical steer the integrated roofing accessory 11 as a whole, and/or the antenna 313 individually to provide greater range steering for the beam. In some embodiments, the computing devices and/or processors may physically steer in the integrated roofing accessory 11 as a whole, and/or the antenna 313 individually to maintain the beam within the center of the FOV of the antenna 313 until the physical steering range has been reached, and then steering the beam itself within the FOV of the antenna 313. Accordingly, the computing devices and/or processors may utilize physical steering of the integrated roofing accessory 11 as a whole, and/or the antenna 313 individually to augment the FOV of the antenna 313 for improved angular range and, thus, improved 5G communications performance with other 5G-enabled devices.

Figure 8A:
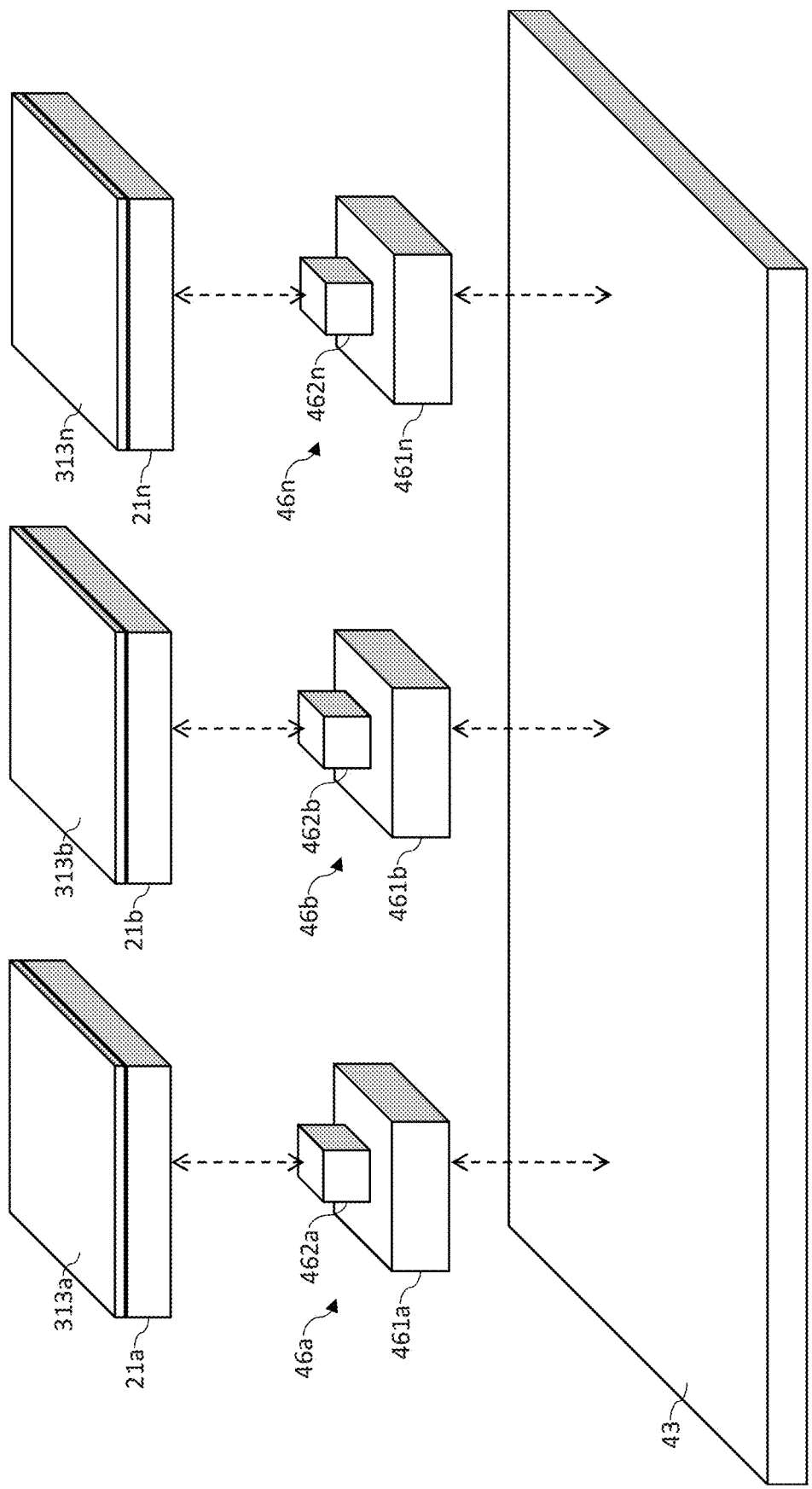

In some embodiments, as illustrated in FIGS. 8A and 8B, an adjustable attachment 46a, 46b through 46c may be provided for each integrated roofing accessory 11 on the roof 43. For example, the roof 43 may include, e.g., two, three, four, five, ten, or more antennae 313a, 313b through 313n and/or sets of electronic components 21a, 21b through 21n and multiples thereof. In some embodiments, the antennae 313a, 313b through 313n and/or sets of electronic components 21a, 21b through 21n may be positioned on one slope of a sloped roof, on multiple sloops of a sloped roof, on a ridge of a sloped roof, in a sub-region of a flat roof, in a sub-region of one or more slopes of a sloped roof, in each sub-region of a flat or sloped roof, or any other configurations or any combination thereof.

In some embodiments, as described above, the attachment mechanisms 462a, 462b through 462n of each adjustable attachment 46a through 46b may be configured to adjustably attach the bodies 461a, 461b through 461n to a respective one of the antennae 313a through 313n and sets of electronic components 21a through 21n, to adjustably attach the bodies 461a through 461n to the roof 43, or both. FIG. 8A, simply for illustration purposes, depicts one attachment mechanism 462a through 462n for each adjustable attachment 46a through 46n. However, the attachment mechanisms 462a through 462n may be on one or both sides of each body 461a through 461n to adjustably position each antennae 313a through 313n and/or sets of electronic components 21a through 21n on the roof 43. In some embodiments, the attachment mechanisms 462a through 462n may include any suitable attachment for permanent or removable attachment of each antennae 313a through 313n and/or sets of electronic components 21a through 21n to the roof 43.

In some embodiments, as illustrated in FIG. 8B, each adjustable attachment 46a through 46n may include the at least one attachment mechanism 462a through 462n to adjustably attach the bodies 461a through 461n to antennae 313a through 313n and sets of electronic components 21a through 21n of each integrated roofing accessory 11. Each of the antennae 313a through 313n are attached to the sets of electronics components 21a through 21n via the adjustable attachments 46a through 46n may be mounted or otherwise positioned on the roof 43 by, e.g., a direct attachment between the sets of the electronics components 21a through 21n and the roof 43. As above, FIG. 8B, simply for illustration purposes, depicts one attachment mechanism 462a through 462n for attaching each set of the electronics components 21a through 21n to each of the antennae 313a through 313n via the adjustable attachments 46a through 46n. However, the attachment mechanisms 462a through 462n may be on one or both sides of each body 461a through 461n.

In some embodiments, the integrated roofing accessories 11 of FIGS. 8A and 8B may be individually or collectively adjusted via the adjustable attachments 46a through 46n. As a result, each integrated roofing accessory 11, and therefore, the FOV of each antenna 313a through 313n may be individually and independently physically steered, and the sets of the electronics components 21a through 21n of each integrated roofing accessory 11 may be individually and independently replaced and/or repaired.

For example, each integrated roofing accessory 11 may be individually controlled, e.g., by respective processing devices of the sets of the electronics components 21a through 21n, according to any one or more of the techniques described above, including logical algorithm, machine learning, or other automated control, or via individual manual control. In some embodiments, the integrated roofing accessories 11 may be collectively controlled by one or more of the processing devices of the sets of the electronics components 21a through 21n, e.g., via a master or primary set of the electronics components 21a through 21n processing device, or via a distributed network to coordinate control across all sets of the electronics components 21a through 21n. For example, the integrated roofing accessories 11 may be collectively controlled to form a larger multi-element antenna array formed from each of the antennae 313a through 313n of the integrated roofing accessories 11 for, e.g., greater MIMO (e.g., as described above).

In some embodiments, the performance of the communication of one or more of the antennae 313a through 313n may be assessed, either independently or in conjunction, with respect to orientation, position or signal strength, or any combination thereof. Thus, antennae 313a through 313n characteristics including orientation, position and signal strength of each individual antennae 313a through 313n may, in any suitable combination, be varied to sample performance data and/or determine improved characteristics for improved signal or communication performance.

Figure 9:
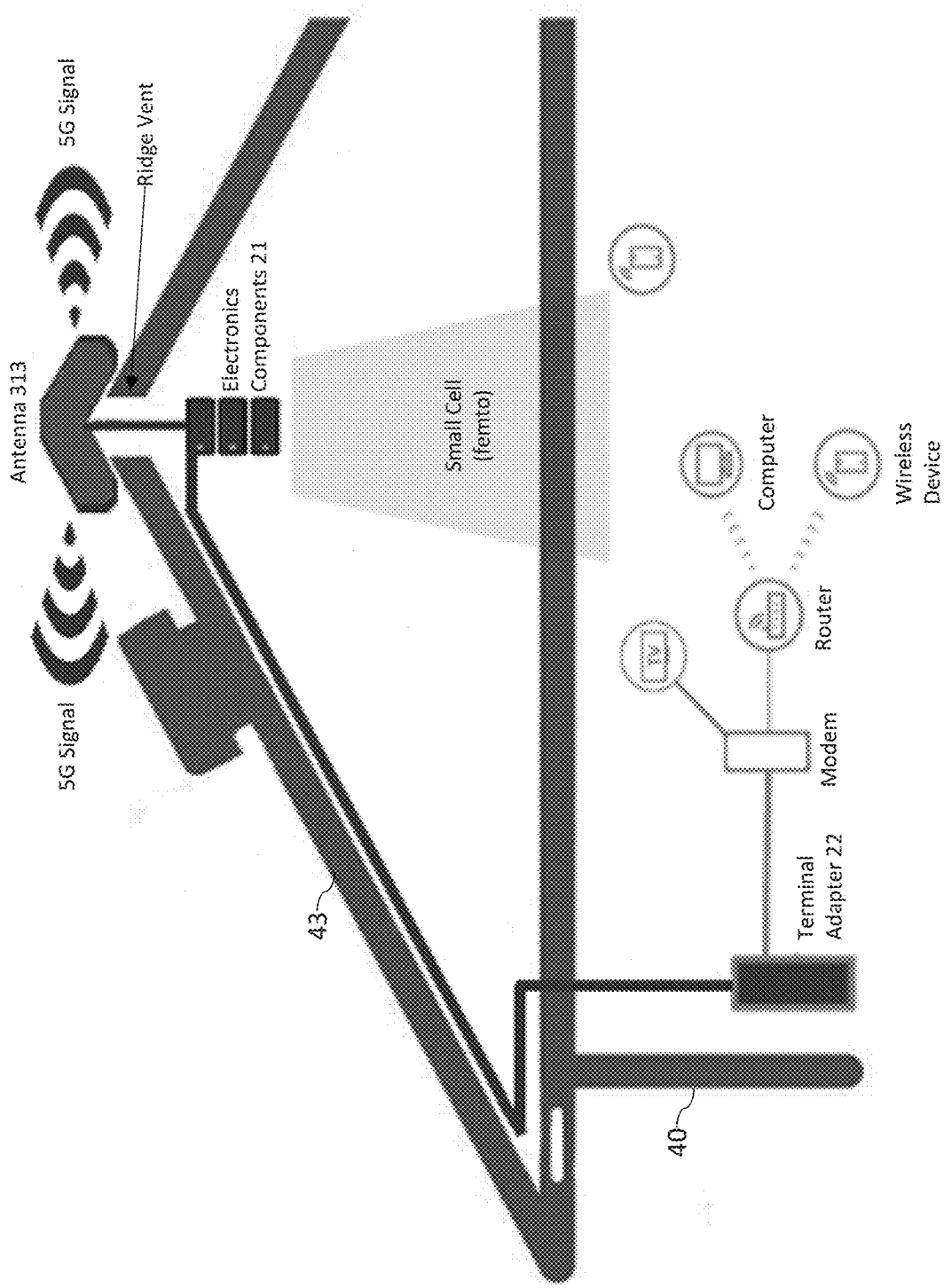
FIG. 9 depicts an illustrative attachment arrangement for an integrated roofing accessory using a ridge vent.

FIG. 9 depicts an integrated roofing accessory 11 installed on a roof 43 via a ridge vent. In some embodiments, the integrated roofing accessory 11 may include the antenna 313 over the ridge vent external to the structure 40 with the electronics components 21 within the structure 40 via the roof vent through the roof 43. In some embodiments, the electronics components 21 may be connected to other electronics within the structure 40, including, e.g., a terminal adapter 22, a modem, a router, among others or any combination thereof. One or more computer and/or one or more wireless device may communicate with the integrated roofing accessory 11, e.g., directly or via the router and/or modem in the structure 40.

FIGS. 10 through 12D depict example embodiments of adjustable attachment of the antenna 313 to a roof vent, e.g., as shown in FIG. 9.

Figure 10:
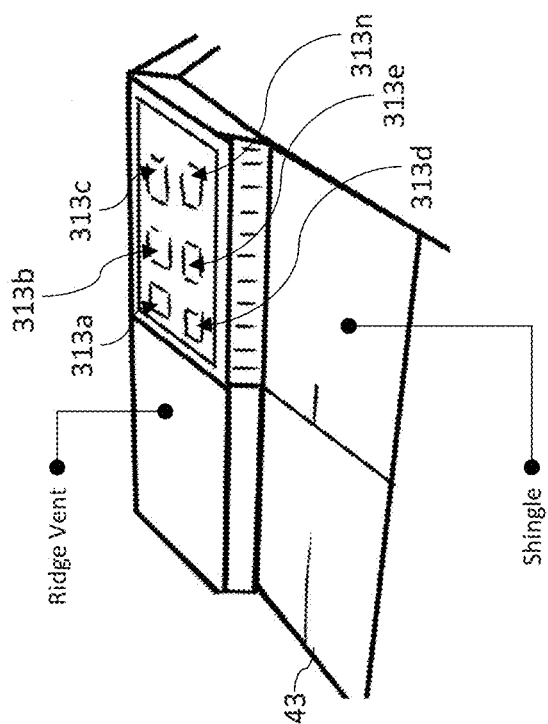
FIG. 10 depicts an illustrative attachment arrangement for an integrated roofing accessory using a ridge vent.

FIG. 10 depicts an integrated roofing accessory 11 installed into a roof vent of a roof 43, with antennae 313a, 313b, 313c, 313d, 313e through 313e of the integrated roofing accessory 11 mounted on the roof vent 11. In some embodiments, the integrated roofing accessory 11 may cap the roof vent and abut or overlap with one or more shingles on the roof 43. As a result, the antennae 313a through 313e sits above the shingle. In some embodiments, the integrated roofing accessory 11 may include the antenna 313a through 313e that is between 1 and 12 inches in length and width, such as, e.g., 1, 2, 3, 4, 5, 6, 7, 8, 9, 10, 11 or 12 inches in length, and 1, 2, 3, 4, 5, 6, 7, 8, 9, 10, 11 or 12 inches in width. The antenna 313 may also have a depth of between 0 and 6 inches, such as, e.g., 0.25 to 0.50, 0.50 to 0.75, 0.75 to 1.00, 1.00 to 1.25, 1.25 to 1.50, 1.50 to 1.75, 1.75 to 2.00, 2.00 to 2.25, 2.25 to 2.50, 2.50 to 2.75, 2.75 to 3.00, or 3.00 or greater in depth.

FIG. 11A depicts an adjustable attachment 46 arrangement whereby an attachment mechanism 462 adjustably attaches an antenna 313 to a body (not shown) within a ridge vent. In some embodiments, the attachment mechanism 462 include an axle that traverses a first axis of the antenna 313 such that the antenna can pivot about the first axis. In some embodiments, the first axis is parallel to the slope of the ridge vent in order to enable the antenna 313 to pivot about the first axle parallel to the slope of the ridge vent for side-to-side steering of the FOV of the antenna 313. Optionally, the axle may be connected to a motor 463 (e.g., within the body 461) for automatically controlled actuation of the adjustable attachment 46.

FIG. 11B depicts an adjustable attachment 46 arrangement whereby an attachment mechanism 462 adjustable attaches an antenna 313 to a body (not shown) within a ridge vent. In some embodiments, the attachment mechanism 462 include an axle that traverses a second axis of the antenna 313 such that the antenna can pivot about the second axis. In some embodiments, the second axis is perpendicular to the slope of the ridge vent in order to enable the antenna 313 to pivot about the axle perpendicular to the slope of the ridge vent for up-and-down steering of the FOV of the antenna 313. Optionally, the axle may be connected to a motor 463 (e.g., within the body 461) for automatically controlled actuation of the adjustable attachment 46.

Figure 12A:
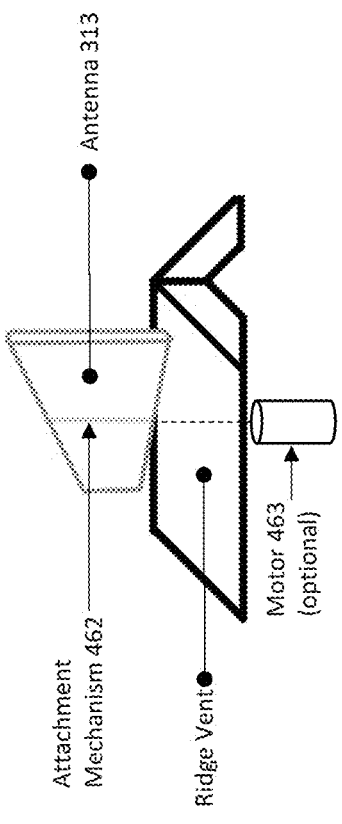
FIGS. 12A through 12E depict one or more additional embodiments of various illustrative attachment mechanisms for an integrated roofing accessory using a ridge vent.
Figure 12B:
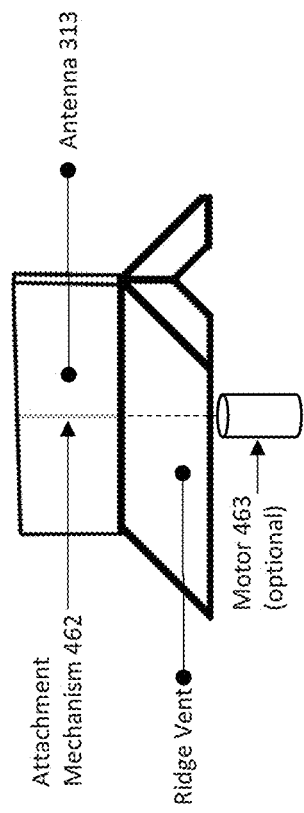
Figure 12C:
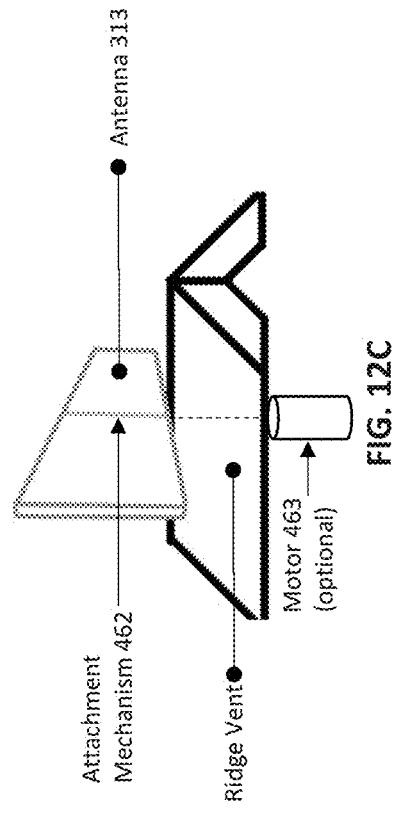

FIGS. 12A though 12C depict an adjustable attachment 46 arrangement whereby an attachment mechanism 462 adjustable attaches an antenna 313 to a body (not shown) within a ridge vent whereby the antenna 313 extends vertically above the ridge vent such that at least one face of the antenna 313 has a vertical orientation. In some embodiments, the attachment mechanism 462 include an axle that traverses a first axis of the antenna 313 such that the antenna can pivot about the first axis. In some embodiments, the first axis is aligned with the vertical orientation in order to enable the antenna 313 to pivot above the ridge vent about the axle for side-to-side steering of the FOV of the antenna 313. FIGS. 12A through 12C show the antenna 313 is three positions of physical steering about the axle. Optionally, the axle may be connected to a motor 463 (e.g., within the body 461) for automatically controlled actuation of the adjustable attachment 46.

Figure 12E:
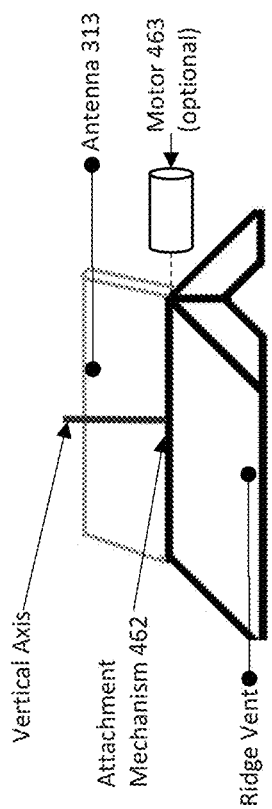
Figure 12D:
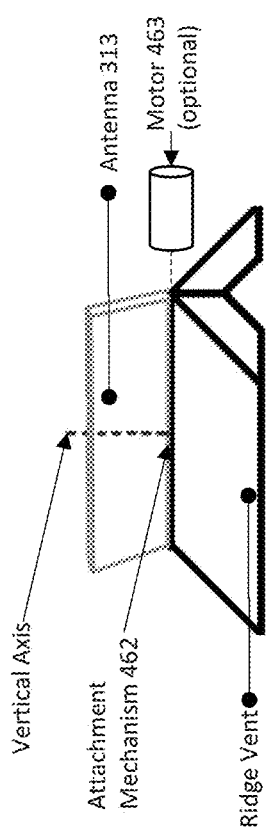
Figure 14:
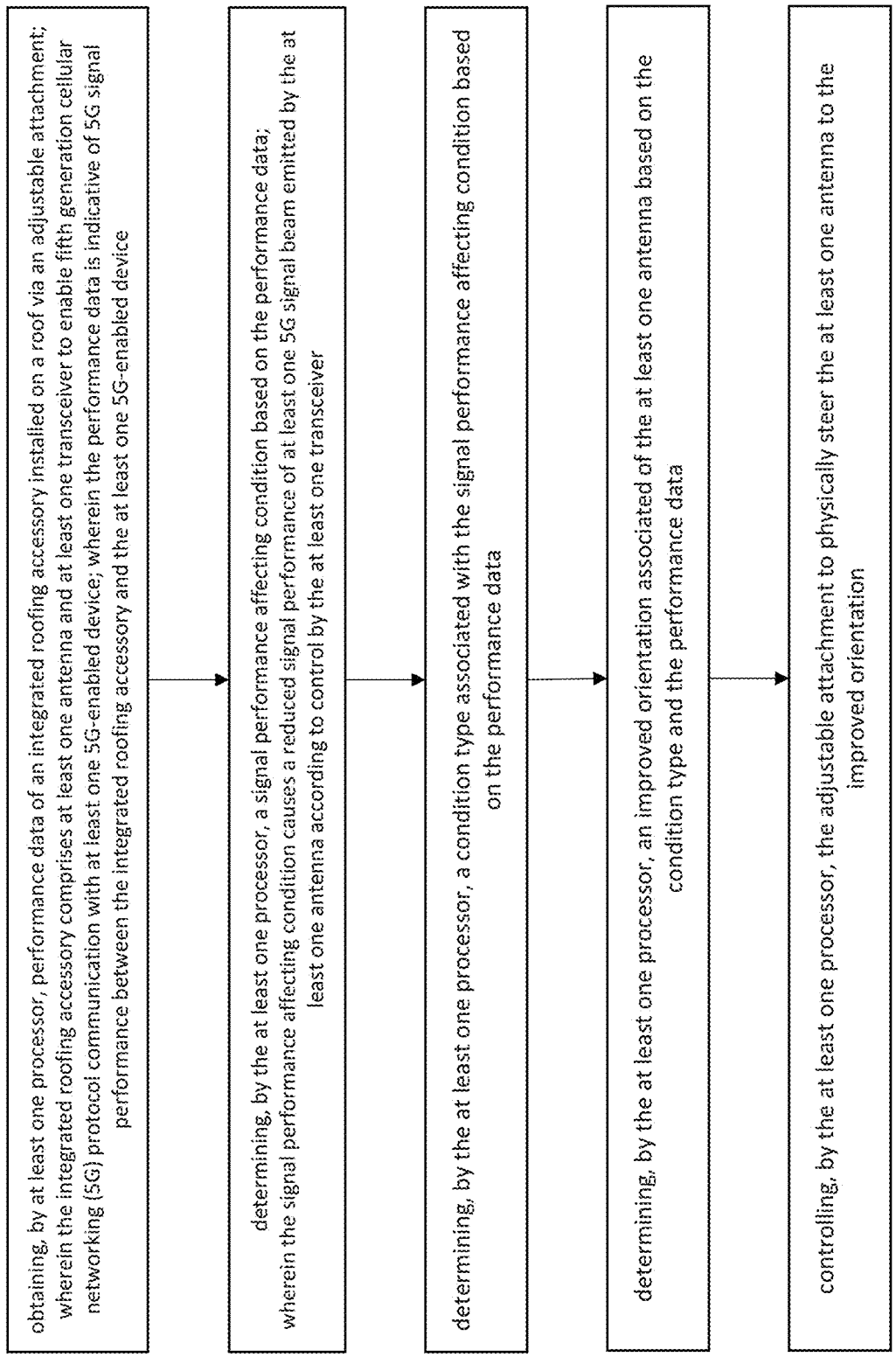
FIG. 14 depicts a flowchart of an illustrative method for optimizing a position and/or orientation of an integrated roofing accessory via an attachment mechanism.
Figure 15:
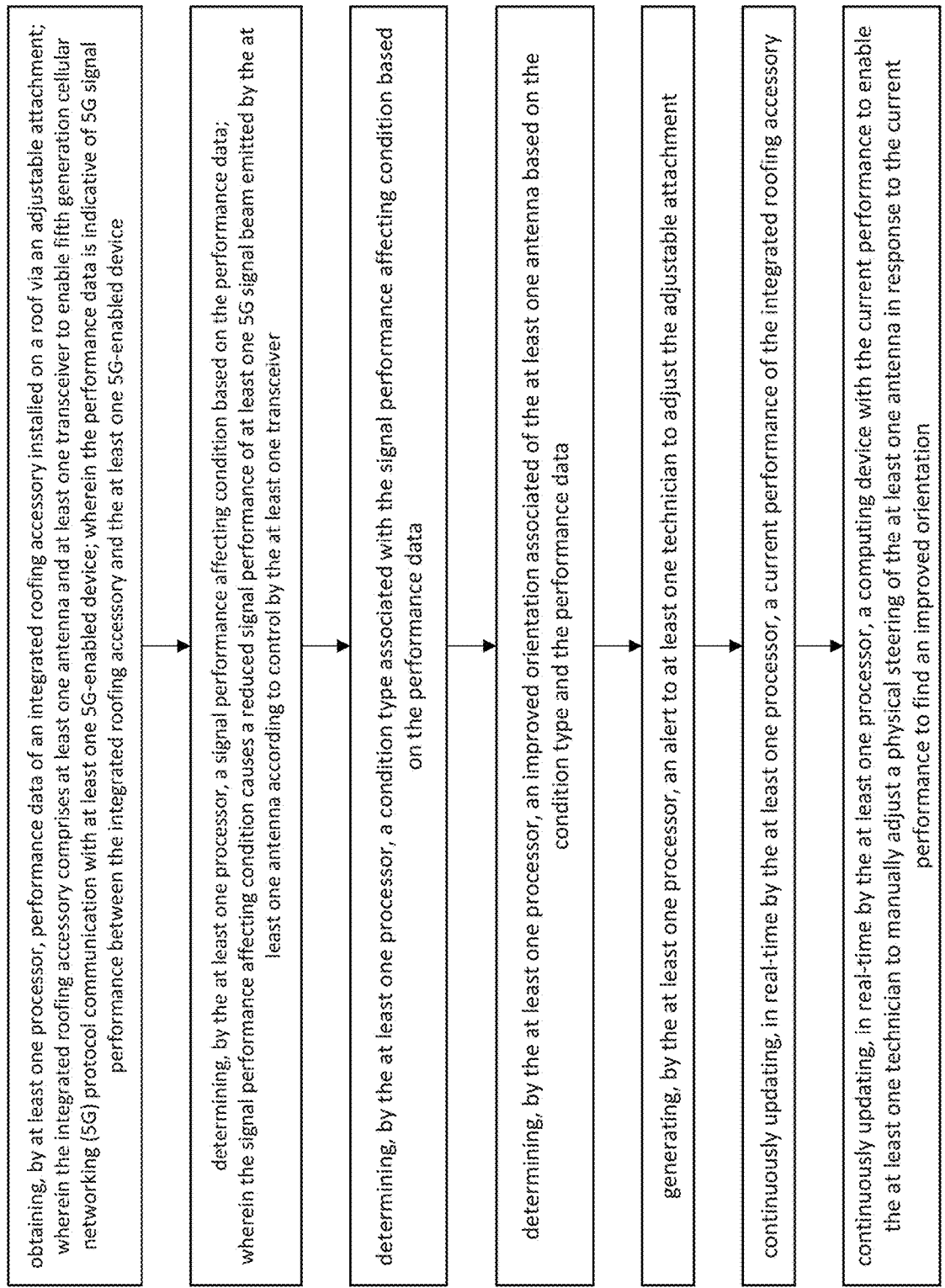
FIG. 15 depicts a flowchart of an illustrative method for optimizing a position and/or orientation of an integrated roofing accessory via an attachment mechanism.

FIGS. 12D and 12E depicts an antenna 313 extends vertically above a ridge vent such that at least one face of the antenna 313 has a vertical orientation similar to FIGS. 12A through 12C. In addition to or instead of an attachment mechanism 462 including a vertically oriented axle, the attachment mechanism 462 may include a hinge or horizontally oriented axle at a base of the antenna 313 where the antenna meets the ridge vent. The hinge or horizontally oriented axle enables the antenna 313 to be physically steered about an axis aligned with the peak of the ridge vent as shown by the positions illustrated in each of FIG. 12D and FIG. 12E. Optionally, the axle may be connected to a motor 463 (e.g., within the body 461) for automatically controlled actuation of the adjustable attachment 46.

FIG. 13 depicts an integrated roofing accessory 11 that includes a roofing fixture extending about a roof. In some embodiments, the roofing fixture may include an internal space in which the antenna 313 of the integrated roofing accessory 11 may be housed. In some embodiments, the antenna 313 may rotate about a vertical axis ("Z-Axis") that extends vertically about the roof. In some embodiments, the antenna 313 rotate though any suitable angular range of motion about the Z-Axis, such as, e.g., 20 degrees, 30 degrees, 40 degrees, 45 degrees, 50 degrees, 60 degrees, 70 degrees, 80 degrees, 90 degrees, 180 degrees, 360 degrees, or any combination and/or multiple thereof. In some embodiments, the roofing fixture may serve as, e.g., a part of the adjustable attachment 46, such as the body 461. Thus, attached to the roofing fixture may be an attachment mechanism 462 that holds the antenna 313 for rotation about the Z-Axis using a suitable rotational motor, bearing, gear set, or other mechanism. Optionally, the axle may be connected to a motor 463 (e.g., within the body 461) for automatically controlled actuation of the adjustable attachment 46. However, in some embodiments, the attachment mechanism 462 may be separate from the roofing fixture, and thus the roofing fixture may be a distinct part form the adjustable attachment 46. Accordingly, the roofing fixture may be constructed from a material that has a minimal effect on the 5G transmissions emitted by the antennae 313, such as a material that may be transparent to mmWave transmissions, thus causing little sufficiently low attenuation to the mmWave transmissions for a stable data transmission or reception. For example, the roofing fixture may include a polymer, including engineered polymers, such as the D30™ Gear4™ and 5G Signal Plus material having microvoids for reducing mmWave attenuation, as described above.

In some embodiments, a method may be implemented for providing an integrated roofing accessory. In some embodiments, the integrated roofing accessory includes at least one antenna and at least one transceiver to enable fifth generation cellular networking (5G) protocol communication with at least one 5G-enabled device. In some embodiments, the integrated roofing accessory: continuously updates, in real-time, a current performance indicative of 5G signal performance between the integrated roofing accessory and the at least one 5G-enabled device, and continuously updates, in real-time, a computing device with the current performance to enable the at least one technician to view the current performance to find an improved orientation. In some embodiments, the integrated roofing accessory includes at least one adjustable attachment that attaches the integrated roofing accessory to the roof. In some embodiments, the method includes manually repositioning the integrated roofing accessory by adjusting the at least one adjustable attachment based on the current performance.

In some embodiments, a method may be implemented for providing an integrated roofing accessory. In some embodiments, the integrated roofing accessory includes at least one antenna and at least one transceiver to enable fifth generation cellular networking (5G) protocol communication with at least one 5G-enabled device. In some embodiments, the integrated roofing accessory includes at least one adjustable attachment that attaches the integrated roofing accessory to the roof. In some embodiments, the method includes manually repositioning the integrated roofing accessory by adjusting the at least one adjustable attachment based on performance data indicative of 5G signal performance between the integrated roofing accessory and the at least one 5G-enabled device.

At least some aspects of the present disclosure will now be described with reference to the following numbered clauses.

1. A method comprising:
   obtaining, by at least one processor, performance data of an integrated roofing accessory installed on a roof,
      wherein the integrated roofing accessory comprises:
         at least one antenna and at least one transceiver to enable fifth generation cellular networking (5G) protocol communication with at least one 5G-enabled device, and
         at least one adjustable attachment configured to at least one of orient or position the at least one antenna;
      wherein the performance data is indicative of 5G signal performance between the integrated roofing accessory and the at least one 5G-enabled device;
   determining, by the at least one processor, a signal performance affecting condition based, at least in part, on the performance data;
      wherein the signal performance affecting condition is a reduced signal performance of at least one 5G signal beam emitted by the at least one antenna according to control by the at least one transceiver;
   determining, by the at least one processor, an improved orientation of the at least one antenna to remedy the signal performance affecting condition; and
   controlling, by the at least one processor, the at least one adjustable attachment to physically adjust an orientation the at least one antenna to achieve the improved orientation.

2. A method comprising:
   obtaining, by at least one processor, performance data of a plurality of integrated roofing accessories installed on a roof;
      wherein each integrated roofing accessory of the plurality of integrated roofing accessories comprises:
         at least one antenna of a plurality of antennae and at least one transceiver of to enable fifth generation cellular networking (5G) protocol communication with at least one 5G-enabled device, and
         at least one adjustable attachment of a plurality of adjustable attachments configured to at least one of orient or position the at least one antenna of the plurality of antennae;
      wherein the performance data is indicative of 5G signal performance between the plurality of integrated roofing accessories and the at least one 5G-enabled device;
   determining, by the at least one processor, a signal performance affecting condition based, at least in part, on the performance data;
      wherein the signal performance affecting condition is a reduced signal performance of at least one 5G signal beam emitted by the plurality of antenna according to control by the at least one transceiver;
   individually determining, by the at least one processor, for each antenna of the plurality of antennae, at least one of an improved orientation or an improved position to remedy the signal performance affecting condition; and
   individually controlling, by the at least one processor, each adjustable attachment of the plurality of adjustable attachments to physically adjust each antenna of the plurality of antennae to achieve the at least one of the improved orientation or the improved position.

3. An integrated roofing accessory comprising:
   at least one antenna configured to emit a fifth generation cellular networking (5G) protocol communication signal;
   at least one transceiver to enable 5G protocol communication with at least one 5G-enabled device using the 5G protocol communication signal; and
   at least one attachment mechanism that is configured to attach at least one of the at least one antenna or the at least one transceiver within or to the integrated roofing accessory;
      wherein the at least one attachment mechanism is configured to:
         physically steer the at least one antenna from a current orientation to a subsequent orientation so as to improve a performance of the 5G protocol communication with the at least one 5G-enabled device,
         physically reposition the at least one antenna from a current position to a subsequent position so as to improve the performance of the 5G protocol communication with the at least one 5G-enabled device, or
         allow at least one of the at least one antenna or the at least one transceiver to be replaced in the integrated roofing accessory.

4. The systems and methods of any of clauses 1 through 3, wherein the determining the improved performance comprises:
   controlling, by the at least one processor, the at least one adjustable attachment to at least one of:
      physically adjust an orientation of at least one antenna to at least one predetermined orientation, or
      physically adjust a position of at least one antenna to at least one predetermined position;
   obtaining, by the at least one processor, sample performance data for at least one of a predetermined range of orientations for the at least one of antenna or a predetermined range of positions for the at least one of antenna; and
   at least one of:
      determining, by the at least one processor, the improved orientation to be an orientation of the at least one antenna having the greatest performance based, at least in part, on the sample performance data, or
      determining, by the at least one processor, the improved position to be a position of the at least one antenna having the greatest performance based, at least in part, on the sample performance data.

5. The systems and methods of any of clauses 1 through 3, wherein the determining the improved orientation comprises:
   controlling, by the at least one processor, the at least one adjustable attachment to physically steer the at least one antenna from a previous orientation to a new orientation;
   obtaining, by the at least one processor, sample performance data for the new orientation; and
   determining, by the at least one processor, the improved orientation to be one of the previous orientation or the new orientation that has the greatest performance based, at least in part, on the sample performance data.

6. The systems and methods of any of clauses 1 through 3, wherein the signal performance affecting condition is caused by an insufficient field-of-view (FOV) of the at least one antenna.

7. The systems and methods of any of clauses 1 through 3, wherein the signal performance affecting condition is caused by an environmental obstruction.

8. The systems and methods clause 5, wherein the improved orientation of the at least one antenna is an orientation where the 5G protocol communication is directed around the environmental obstruction.

9. The systems and methods of any of clauses 1 through 3, further comprising causing to rotate, by the at least one processor, a gear engaged with the at least one adjustable attachment to cause the at least one adjustable attachment to physically adjust the orientation the at least one antenna to achieve the improved orientation.

10. The systems and methods of any of clauses 1 through 3, further comprising controlling, by the at least one processor, at least one motor of the at least one adjustable attachment to cause the at least one adjustable attachment to physically adjust the orientation the at least one antenna to achieve the improved orientation.

11. The systems and methods of clause 8, wherein the at least one motor comprises a linear actuator.

12. The systems and methods of clause 8, wherein the at least one motor comprises an electric motor.

13. The systems and methods of any of clauses 1 through 3, wherein the signal performance affecting condition is caused by an insufficient field-of-view (FOV) of the at least one antenna.

14. The systems and methods of any of clauses 1 through 3, wherein the signal performance affecting condition is caused by a feature of physical environment obstructing signaling.

13. The systems and methods of any of clauses 1 through 3, wherein the at least one of the optimal orientation or the optimal position improves on an insufficient field-of-view (FOV) of the at least one antenna.

14. The systems and methods of any of clauses 1 through 3, wherein the at least one of the optimal orientation or the optimal position avoids an environmental obstruction.

15. The systems and methods of clause 14, wherein the at least one of the optimal orientation or the optimal position comprises a physical steering of the at least one antenna to re-orient the 5G protocol communication around the environmental obstruction.

16. The systems and methods of any of clauses 1 through 3, further comprising causing to rotate, by the at least one processor, at least one gear engaged with the at least one adjustable attachment of the plurality of attachments to cause the at least one antenna of the plurality of antennae to achieve the at least one of the optimal orientation or the optimal position.

17. The systems and methods of any of clauses 1 through 3, further comprising controlling, by the at least one processor, at least one motor of the at least one adjustable attachment of the plurality of attachments to cause the at least one antenna of the plurality of antennae to achieve the at least one of the optimal orientation or the optimal position.

18. The systems and methods of clause 18, wherein the at least one motor comprises a linear actuator.

19. The systems and methods of clause 18, wherein the at least one motor comprises an electric motor.

20. The systems and methods of any of clauses 1 through 3, wherein the determining the at least one of the optimal orientation or the optimal position comprises:
controlling, by the at least one processor, the at least one adjustable attachment of the plurality of adjustable attachments to at least one of:
physically steer each antenna of the plurality of antennae to at least one predetermined orientation, or
physically reposition each antenna of the plurality of antennae to at least one predetermined position;
obtaining, by the at least one processor, sample performance data for at least one of a predetermined range of orientations for the plurality of antennae or a predetermined range of positions for the plurality of antennae; and
at least one of:
determining, by the at least one processor, the optimal orientation to be an orientation of each antenna of the plurality of antennae having the greatest performance based, at least in part, on the sample performance data, or
determining, by the at least one processor, the optimal position to be a position of each antenna of the plurality of antennae having the greatest performance based, at least in part, on the sample performance data.

As used herein, the term "at least one X or Y" means X, Y or X and Y, where X can be substituted with any term and Y can be substituted with any term.

While several embodiments of the present disclosure have been described, these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A method comprising:
obtaining, by at least one processor, performance data of an integrated roofing accessory installed on a roof of a home;
wherein the integrated roofing accessory comprises:
at least one roofing component comprising at least one of:
a home roofing cap,
a home laminate roofing accessory,
a home roofing sheet,
a home ridge cap,
a home ridge vent,
a home roofing frame, or
a home roofing shingle; and
at least one antenna and at least one transceiver to enable wireless networking protocol communication with at least one wireless network-enabled device,
at least one attachment mechanism configured to at least one of orient or position the at least one antenna;
determining, by the at least one processor, a signal performance affecting condition based, at least in part, on the performance data;
wherein the signal performance affecting condition is a reduced signal performance of at least one wireless network signal beam emitted or received by the at least one antenna according to control by the at least one transceiver;

determining, by the at least one processor, an improved orientation of the at least one wireless network signal beam to remedy the signal performance affecting condition; and controlling, by the at least one processor, the at least one attachment mechanism to physically adjust an orientation or position of the at least one antenna to achieve the improved orientation.

2. The method of claim 1, wherein the determining the improved orientation comprises:
controlling, by the at least one processor, the at least one attachment mechanism to at least one of:
physically adjust an orientation of at least one antenna to at least one predetermined orientation, or
physically adjust a position of at least one antenna to at least one predetermined position;
obtaining, by the at least one processor, sample performance data for at least one of a predetermined range of orientations for the at least one of antenna or a predetermined range of positions for the at least one of antenna; and
at least one of:
determining, by the at least one processor, the improved orientation to be an orientation of the at least one antenna having a greatest performance based, at least in part, on the sample performance data, or
determining, by the at least one processor, the improved position to be a position of the at least one antenna having the greatest performance based, at least in part, on the sample performance data.

3. The method of claim 1, wherein the determining the improved orientation comprises:
controlling, by the at least one processor, the at least one attachment mechanism to physically steer the at least one antenna from a previous orientation to a new orientation;
obtaining, by the at least one processor, sample performance data for the new orientation; and
determining, by the at least one processor, the improved orientation to be one of the previous orientation or the new orientation that has a greatest performance based, at least in part, on the sample performance data.

4. The method of claim 1, wherein the signal performance affecting condition is caused by an insufficient field-of-view (FOV) of the at least one antenna.

5. The method of claim 1, wherein the signal performance affecting condition is caused by an environmental obstruction.

6. The method of claim 5, wherein the improved orientation of the at least one antenna is an orientation where the wireless network protocol communication is directed around the environmental obstruction.

7. The method of claim 1, further comprising causing to rotate, by the at least one processor, a gear engaged with the at least one attachment mechanism to cause the at least one attachment mechanism to physically adjust the orientation the at least one antenna to achieve the improved orientation.

8. The method of claim 1, further comprising controlling, by the at least one processor, at least one motor of the at least one attachment mechanism to cause the at least one attachment mechanism to physically adjust the orientation the at least one antenna to achieve the improved orientation.

9. An integrated roofing accessory comprising:
at least one roofing component on a roof of a home, the at least one roofing component comprising at least one of:
a home roofing cap,
a home laminate roofing accessory,
a home roofing sheet,
a home ridge cap,
a home ridge vent,
a home roofing frame, or
a home roofing shingle;
at least one antenna configured to emit a wireless network protocol communication signal;
at least one transceiver to enable 5G wireless network protocol communication with at least one wireless network-enabled device using the wireless network protocol communication signal; and
at least one attachment mechanism that is configured to attach at least one of the at least one antenna or the at least one transceiver within or to the integrated roofing accessory;
wherein at least one processor is configured to control the at least one attachment mechanism to:
physically steer the at least one antenna from a current orientation to a subsequent orientation so as to improve a performance of the wireless network protocol communication with the at least one wireless network-enabled device,
physically reposition the at least one antenna from a current position to a subsequent position so as to improve the performance of the wireless network protocol communication with the at least one wireless network-enabled device, or
allow at least one of the at least one antenna or the at least one transceiver to be replaced in the integrated roofing accessory.

10. The integrated roofing accessory as recited in claim 9, wherein the at least one antenna is a plurality of antennas; and
wherein each antenna of the plurality of antennas is positioned at a respective antenna-specific orientation.

11. The integrated roofing accessory as recited in claim 10, wherein the at least one processor is further configured to:
control the at least one transceiver to shift at least one wireless network signal beam from a first antenna of the plurality of antennas to a second antenna of the plurality of antennas;
wherein the first antenna is positioned at a first antenna-specific orientation; and
wherein the second antenna is positioned at a second antenna-specific orientation different from the first antenna-specific orientation.

12. The integrated roofing accessory as recited in claim 9, wherein the at least one processor is further configured to:
control the at least one attachment mechanism to at least one of:
physically adjust an orientation of at least one antenna to at least one predetermined orientation, or
physically adjust a position of at least one antenna to at least one predetermined position;
obtain sample performance data for at least one of a predetermined range of orientations for the at least one of antenna or a predetermined range of positions for the at least one of antenna; and
at least one of:
determine the improved orientation to be an orientation of the at least one antenna having a greatest performance based, at least in part, on the sample performance data, or determine the improved position to be a position of the at least one antenna having the greatest performance based, at least in part, on the sample performance data.

13. The integrated roofing accessory of claim 9, wherein the at least one processor is further configured to:
control the at least one attachment mechanism to physically steer the at least one antenna from a previous orientation to a new orientation;
obtain sample performance data for the new orientation; and
determine the improved orientation to be one of the previous orientation or the new orientation that has a greatest performance based, at least in part, on the sample performance data.

14. The integrated roofing accessory of claim 9, wherein at least one processor is configured to control the at least one attachment mechanism in response to a signal performance affecting condition, wherein the signal performance affecting condition is caused by an insufficient field-of-view (FOV) of the at least one antenna.

15. The integrated roofing accessory of claim 9, wherein at least one processor is configured to control the at least one attachment mechanism in response to a signal performance affecting condition, wherein the signal performance affecting condition is caused by an environmental obstruction.

16. The integrated roofing accessory of claim 15, wherein the improved orientation of the at least one antenna is an orientation where the wireless network protocol communication is directed around the environmental obstruction.

17. The integrated roofing accessory of claim 9, further comprising causing to rotate, by the at least one processor, a gear engaged with the at least one attachment mechanism to cause the at least one attachment mechanism to physically adjust the orientation the at least one antenna to achieve the improved orientation.

18. The integrated roofing accessory of claim 9, wherein the at least one processor is further configured to control at least one motor of the at least one attachment mechanism to cause the at least one attachment mechanism to physically adjust the orientation the at least one antenna to achieve the improved orientation.

19. The method as recited in claim 1, wherein the at least one antenna is a plurality of antennas; and
wherein each antenna of the plurality of antennas is positioned at a respective antenna-specific orientation.

20. The method as recited in claim 19, further comprising:
controlling, by the at least one processor, the at least one transceiver to shift the at least one wireless network signal beam from a first antenna of the plurality of antennas to a second antenna of the plurality of antennas;
wherein the first antenna is positioned at a first antenna-specific orientation; and
wherein the second antenna is positioned at a second antenna-specific orientation different from the first antenna-specific orientation.

* * * * *